US008144991B2

(12) United States Patent
Nagamatsu et al.

(10) Patent No.: US 8,144,991 B2
(45) Date of Patent: Mar. 27, 2012

(54) APPARATUS, METHOD, AND COMPUTER PROGRAM FOR PROCESSING INFORMATION

(75) Inventors: Tatsuo Nagamatsu, Tokyo (JP); Kunitoshi Shimizu, Kanagawa (JP); Tsutomu Teranishi, Tokyo (JP); Takao Okuda, Tokyo (JP); Hiroshi Kawaguchi, Kanagawa (JP); Atsushi Mitsuzawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 948 days.

(21) Appl. No.: 11/240,512

(22) Filed: Oct. 3, 2005

(65) Prior Publication Data

US 2006/0072827 A1    Apr. 6, 2006

(30) Foreign Application Priority Data

Oct. 6, 2004    (JP) .................................. 2004-293616

(51) Int. Cl.
*G06K 9/46* (2006.01)
(52) U.S. Cl. ....................... 382/190; 375/240.01; 725/32
(58) Field of Classification Search .................. 382/190, 382/100; 375/240.01; 725/32
See application file for complete search history.

(56) References Cited

U.S. PATENT DOCUMENTS

| | | | | |
|---|---|---|---|---|
| 5,999,689 A * | 12/1999 | Iggulden | ........................ | 386/248 |
| 6,167,167 A * | 12/2000 | Matsugu et al. | .............. | 382/283 |
| 6,449,021 B1 * | 9/2002 | Ohta et al. | ..................... | 348/700 |
| 6,469,749 B1 * | 10/2002 | Dimitrova et al. | ............ | 348/722 |
| 2002/0001395 A1 * | 1/2002 | Davis et al. | ..................... | 382/100 |
| 2004/0194130 A1 * | 9/2004 | Konig et al. | ..................... | 725/32 |
| 2006/0075431 A1 * | 4/2006 | Nagamatsu et al. | ............ | 725/45 |
| 2006/0248569 A1 * | 11/2006 | Lienhart et al. | ............... | 725/135 |

FOREIGN PATENT DOCUMENTS

| | | |
|---|---|---|
| JP | 2000-69414 | 3/2000 |
| JP | 2003-32631 | 1/2003 |
| JP | 2004-23589 | 1/2004 |
| JP | 2004-266769 | 9/2004 |

* cited by examiner

*Primary Examiner* — Vu Le
*Assistant Examiner* — Michael Vanchy, Jr.
(74) *Attorney, Agent, or Firm* — Oblon, Spivak, McClelland, Maier & Neustadt, L.L.P.

(57) ABSTRACT

An information processing apparatus includes a selecting unit for selecting extraction information concerning contents to be extracted from among a plurality of contents organized in time sequence, the extraction information prepared on a per content basis for the contents to be extracted and including a feature contained in the content to be extracted, and an extraction range that is represented with respect to the position of the feature, a detecting unit for detecting, from the contents, the same feature as the feature contained in the extraction information selected by the selecting unit, and an extracting unit for extracting a predetermined content in accordance with the extraction range contained in the extraction information selected by the selecting unit if the detecting unit detects the same feature as the feature contained in the extraction information.

13 Claims, 21 Drawing Sheets

PATTERN FILE

CM TITLE
EXTRACTION LOCATION
LOGO IMAGE
MASK
CM START POSITION
CM END POSITION

REMOVAL LOCATION

PATTERN FILE

CM TITLE
POSITION OF LOGO IMAGE
EXTRACTION LOCATION
LOGO IMAGE
MASK
CM START POSITION
CM END POSITION

APPARATUS, METHOD, AND COMPUTER PROGRAM FOR PROCESSING INFORMATION

CROSS REFERENCES TO RELATED APPLICATIONS

The present invention contains subject matter related to Japanese Patent Application JP 2004-293616 filed in the Japanese Patent Office on Oct. 6, 2004, the entire contents of which are incorporated herein by reference.

BACKGROUND OF THE INVENTION

1. Field of the Invention

The present invention relates to an apparatus, a method, and a computer program for processing information and, in particular, to an apparatus, a method, and a computer program for precisely extracting a commercial (CM) from an entire content that is a mixture of a television program and the commercial.

2. Description of the Related Art

During the replaying of a recorded television program, commercials (CMs) are skipped. Since broadcasting of most of CMs lasts for 15 seconds or 30 seconds, a manual skip method for fast forwarding video for a unit of 15 seconds or 30 seconds is used. Also used is an automatic skip method that automatically fast forwards the video only during a stereophonic broadcasting period in a CM audio mode taking advantage of a difference in audio mode between the CM and a television broadcast program. The CM is different in audio mode from the television program, for example, in bilingual broadcast programs and stereophonic broadcast programs.

Japanese Unexamined Patent Application Publication No. 2000-165796 discloses a technique for automatically skipping, cutting, or identifying a CM. In accordance with the disclosed technique, the occurrence of one of a mute period and a scene change, indicating the start position of a CM, is detected, and the end position of the CM is estimated from the occurrence of the one of the mute period and the scene change.

SUMMARY OF THE INVENTION

A variety of techniques to skip the CM during the playback of the television program have been proposed. With the manual skip technique, each user needs to skip each time a CM starts. It takes time for the user to skip the CM. Since the skip operation is manually performed, a slight time delay takes place from the moment the user recognizes the start of the CM to the manual skip operation. It is difficult to accurately index each television program subsequent to CM skipping.

Some CMs are broadcast in a monophonic sound as a television program is, and thus the CM and the television program are broadcast in the same audio mode. In such a mode, the above-referenced skip method detecting the audio mode difference fails to recognize the CM, and the CM skipping cannot be properly performed.

In accordance with the technique disclosed in Japanese Unexamined Patent Application Publication No. 2000-165796, the occurrence of one of the mute period and the scene change is detected. If one of a mute period and a scene change is detected in the middle of a host program, a portion of the host program subsequent to the one of the mute period and the scene can be recognized as a CM. Conversely, if one of a mute period and a scene change takes place several times within the CM, the CM cannot be correctly recognized.

It is thus desirable to precisely extract a CM in a television program.

In accordance with one embodiment of the present invention, an information processing apparatus includes a selecting unit for selecting extraction information concerning contents to be extracted from among a plurality of contents organized in time sequence, the extraction information prepared on a per content basis for the contents to be extracted and including a feature contained in the content to be extracted, and an extraction range that is represented with respect to the position of the feature, a first detecting unit for detecting, from the contents, the same feature as the feature contained in the extraction information selected by the selecting unit, and an extracting unit for extracting a predetermined content in accordance with the extraction range contained in the extraction information selected by the selecting unit if the first detecting unit detects the same feature as the feature contained in the extraction information.

The information processing apparatus may further include a generating unit for generating metadata representing the position of the predetermined content extracted by the extracting unit from the contents.

The content to be extracted may include a commercial contained in a television broadcast content.

The feature contained in the content to be extracted may include a predetermined image displayed by the content.

The feature contained in the content to be extracted may include a predetermined sound provided by the content.

The information processing apparatus may include a second detecting unit for detecting one of a scene change and a mute period, wherein the extraction information further includes position information specifying the position of the feature contained in the content to be extracted and represented with respect to the position of one of the scene change and the mute period. If one of the scene change and the mute period is detected by the second detecting unit, the first detecting unit detects the same feature as the feature, contained in the extraction information, at the position specified by the position information.

The information processing apparatus may include a storage unit storing the extraction information.

The information processing apparatus may further include an update unit for updating the extraction information stored in the storage unit by downloading extraction information from a server connected via a network.

In accordance with another embodiment of the present invention, an information processing method includes steps of selecting extraction information concerning contents to be extracted from among a plurality of contents organized in time sequence, the extraction information prepared on a per content basis for the contents to be extracted and including a feature contained in the content to be extracted, and an extraction range that is represented with respect to the position of the feature, detecting, from the contents, the same feature as the feature contained in the extraction information selected in the selecting step, and extracting a predetermined content in accordance with the extraction range contained in the extraction information selected in the selecting step if the same feature as the feature contained in the extraction information is detected in the detecting step.

In accordance with yet another embodiment of the present invention, a computer program for causing a computer to process information, includes program code for performing steps of selecting extraction information concerning contents to be extracted from among a plurality of contents organized in time sequence, the extraction information prepared on a per content basis for the contents to be extracted and including a feature contained in the content to be extracted, and an extraction range that is represented with respect to the position of the feature, detecting, from the contents, the same feature as the feature contained in the extraction information selected in the selecting step, and extracting a predetermined content in accordance with the extraction range contained in the extraction information selected in the selecting step if the same feature as the feature contained in the extraction information is detected in the detecting step.

In accordance with embodiments of the present invention, the extraction information concerning contents to be extracted from among a plurality of contents organized in time sequence is selected. The extraction information prepared on a per content basis for the contents to be extracted includes the feature contained in the content to be extracted, and the extraction range that is represented with respect to the position of the feature. The same feature as the feature contained in the selected extraction information is detected from the contents. The predetermined content is extracted in accordance with the extraction range contained in the extraction information if the same feature as the feature contained in the extraction information is detected.

In accordance with embodiments of the present invention, a CM is accurately extracted from the contents if a content to be extracted is the CM.

In accordance with embodiments of the present invention, the extraction information for use in the extraction of the content is updated.

DESCRIPTION OF THE PREFERRED EMBODIMENTS

Figure 1:
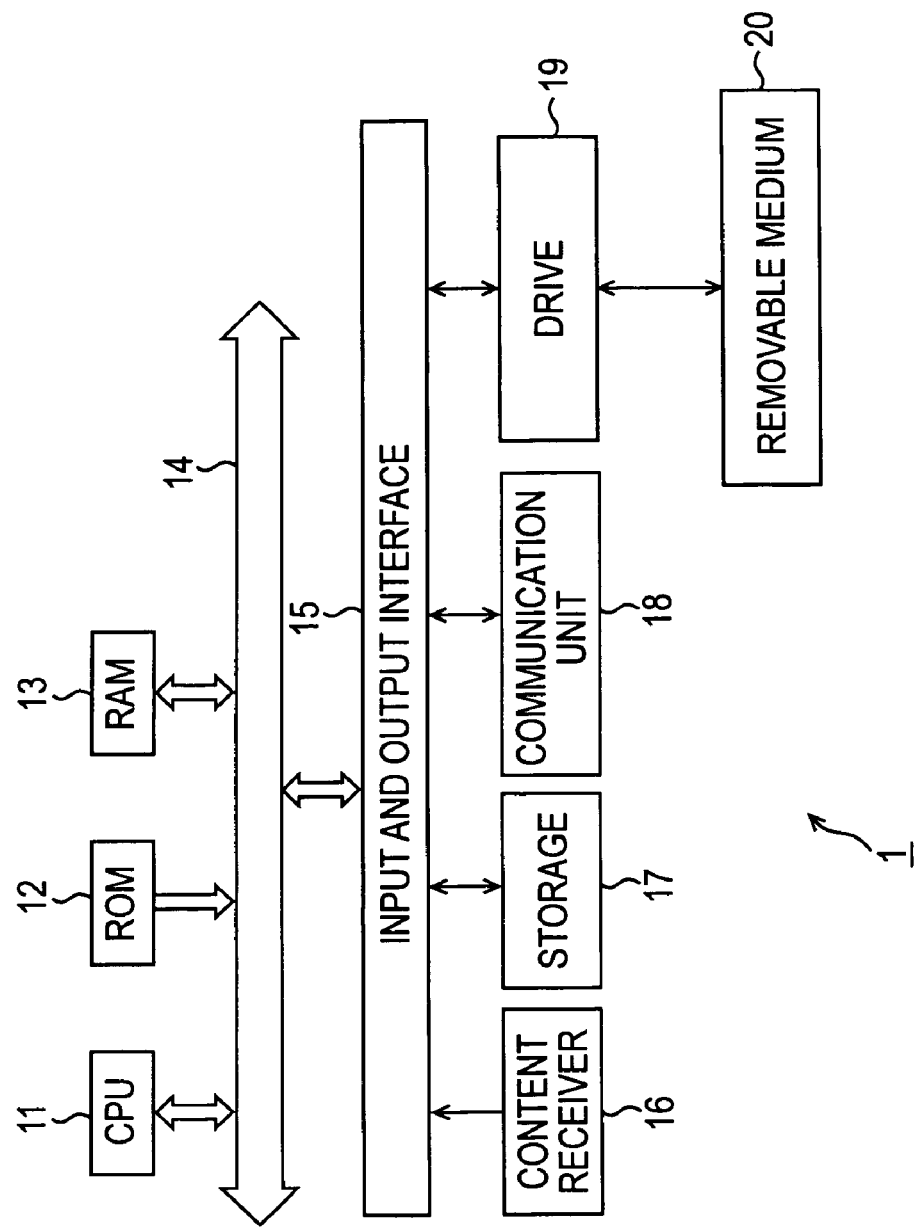
FIG. 1 is a block diagram illustrating an information processing apparatus in accordance with one embodiment of the present invention.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

An information processing apparatus of one embodiment of the present invention includes a selecting unit (for example, a pattern file selector 41 of FIG. 4) for selecting extraction information (for example, a pattern file of FIG. 5) concerning contents to be extracted from among a plurality of contents organized in time sequence, the extraction information prepared on a per content basis for the contents (for example, CMs) to be extracted and including a feature (for example, a "logo image" of FIG. 5) contained in the content to be extracted, and an extraction range (a "CM start position" and a "CM end position" of FIG. 5) that is represented with respect to the position of the feature, a first detecting unit (for example, an image recognizer 32 of FIG. 4) for detecting, from the contents, the same feature as the feature contained in the extraction information selected by the selecting unit, and an extracting unit (for example, a controller 33 of FIG. 4) for extracting a predetermined content in accordance with the extraction range contained in the extraction information selected by the selecting unit if the first detecting unit detects the same feature as the feature contained in the extraction information.

The information processing apparatus further includes a generating unit (for example, a metadata generator 42 of FIG. 4) for generating metadata representing the position of the predetermined content extracted by the extracting unit from the contents.

The information processing apparatus may include a second detecting unit (for example, a scene change detector 71 of FIG. 15) for detecting one of a scene change and a mute period, wherein the extraction information further includes position information (for example, a "position of the logo image" of FIG. 14) specifying the position of the feature contained in the content to be extracted and represented with respect to the position of one of the scene change and the mute period. If one of the scene change and the mute period is detected by the second detecting unit, the first detecting unit detects the same feature as the feature, contained in the extraction information, at the position specified by the position information.

The information processing apparatus includes a storage unit (for example, a pattern file storage unit 52 of FIG. 4) storing the extraction information.

The information processing apparatus further includes an update unit (for example, a pattern file manager 91 of FIG. 22) for updating the extraction information stored in the storage unit by downloading extraction information from a server (for example, a server 81 of FIG. 21) connected via a network.

Figure 5:
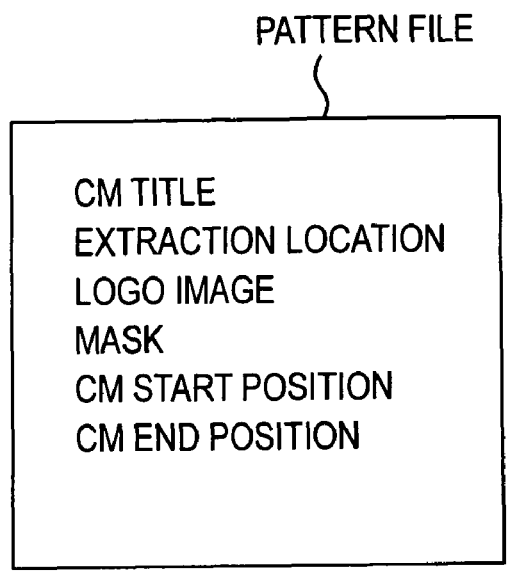
FIG. 5 illustrates a pattern file.

In accordance with another embodiment of the present invention, an information processing method includes steps of selecting (for example, in step S11 of FIG. 8) extraction information (for example, the pattern file of FIG. 5) concerning contents (for example, the CMs) to be extracted from among a plurality of contents organized in time sequence, the extraction information prepared on a per content basis for the contents to be extracted and including a feature (for example, the "logo image" of FIG. 5) contained in the content to be extracted, and an extraction range (for example, the "CM start position" and the "CM end position" of FIG. 5) that is represented with respect to the position of the feature, detecting (for example, in step S14 of FIG. 8), from the contents, the same feature as the feature contained in the extraction information selected in the selecting step, and extracting (for example, in step S31 of FIG. 9) a predetermined content in accordance with the extraction range contained in the extraction information selected in the selecting step if the same feature as the feature contained in the extraction information is detected in the detecting step.

A computer program of one embodiment of the present invention also performs program code for performing the same process steps as the above-described information processing method.

The embodiments of the present invention are described below with reference to the drawings.

FIG. 1 is a block diagram illustrating an information processing apparatus 1 of one embodiment of the present invention.

A central processing unit (CPU) 11 executes a variety of processes in accordance with one of a program stored in a read-only memory (ROM) 12 and a program loaded from a storage unit 17 to a random-access memory (RAM) 13. The RAM 13 also stores data required by the CPU 11 when the CPU 11 performs the variety of processes.

The CPU 11, the ROM 12, and the RAM 13 are interconnected to each other via a bus 14. The bus 14 connects to an input and output interface 15.

A content receiver 16 connected to the input and output interface 15 receives a signal supplied from an antenna (not shown), thereby acquiring a broadcast content containing a television program as a host program and a commercial (CM). The antenna receives a variety of digital broadcast waves such as terrestrial digital broadcast programs, and broadcast satellite (BS)/communication satellite (CS) digital broadcast programs. The broadcast content received by the content receiver 16 is supplied to the storage 17 via the input and output interface 15 for storage.

The input and output interface 15 connects to the storage 17 and a communication unit 18.

The storage 17, including a hard disk, stores the broadcast content supplied from the content receiver 16. The broadcast content stored in the storage 17 is read by the CPU 11. The CPU 11 extracts a CM from the entire broadcast content. The extraction of the CM refers to an operation to allow the entire broadcast content to be handled with a television program portion thereof discriminated from a CM portion thereof.

The communication unit 18 performs a communication process via a network. For example, to extract the CM from the entire broadcast content, the communication unit 18 downloads, from a server connected via the network, a file to be referenced by the CPU 11 (i.e., a pattern file to be discussed later).

A removable medium 20, such as a magnetic disk, an optical disk, a magneto-optic disk, and a semiconductor memory, is loaded onto a drive 19 that is connected to the input and output interface 15 as necessary. A computer program read from the removable medium 20 is installed onto the storage 17. When the broadcast content stored in the removable medium 20, rather than the one received from the content receiver 16, is processed in the information processing apparatus 1, the broadcast content read by the drive 19 is supplied to the storage 17 via the input and output interface 15 for storage.

The information processing apparatus 1 thus constructed extracts a CM from the entire broadcast content, and attaches metadata representing an extraction location (position of the CM) to the broadcast content. The extraction of the CM is performed using the pattern file prepared for each CM.

For example, an image of one frame representing a logo of a manufacturer of a product is contained in a CM of the product (for example, in last one second portion of the CM if time of the entire CM is 15 seconds). To display the logo, the pattern file contains information specifying the image of the logo displayed by the image and a CM start position and a CM end position with respect to the position of the one frame image displaying the logo. The information processing apparatus 1 identifies the start position and the end position of the CM with respect to the position of the one frame image displaying the log, and then extracts the CM. The extraction range is thus defined by the start position and the end position of the CM.

Figure 2:
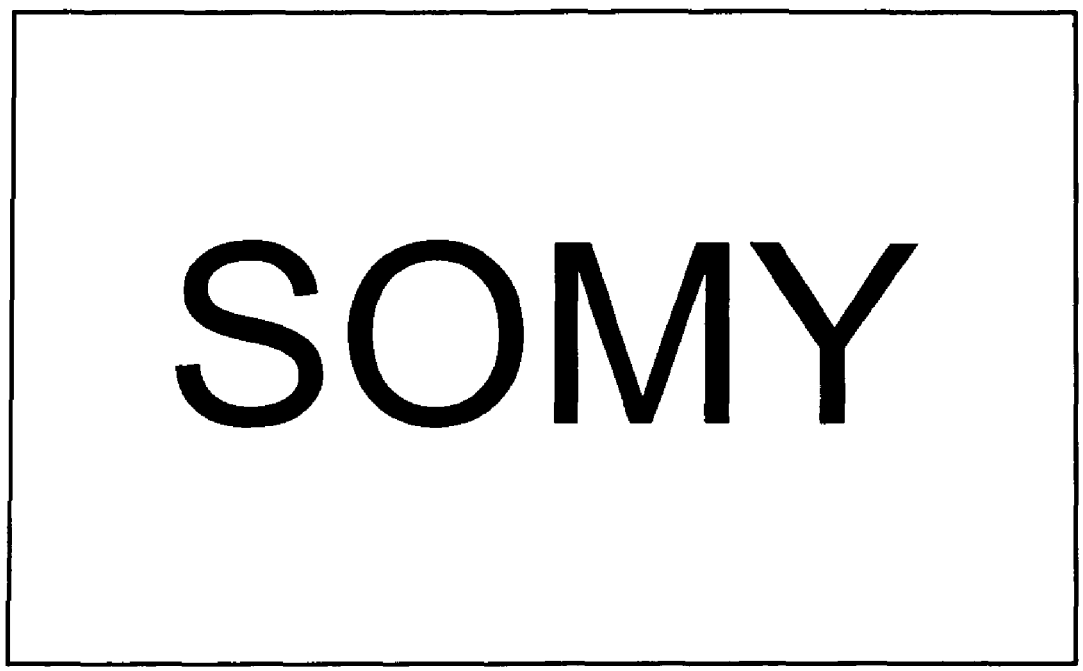
FIG. 2 illustrates a logo image.

More specifically, a CM containing the one frame image displaying "SOMY" as one manufacturer's logo (a broadcast content containing the CM) is processed as shown in FIG. 2. If the pattern file of the CM is prepared, the information processing apparatus 1 recognizes the images of the broadcast content in the order of display, frame by frame, and determines in an image matching process whether the logo of FIG. 2 specified by the pattern file is contained in the recognized images.

If the one frame image displaying the logo "SOMY" is detected, the start position and the end position of the CM with respect to the position of the one frame image displaying the logo "SOMY" are described in the pattern file of the CM. The information processing apparatus 1 thus identifies the start position and the end position of the CM with respect to the position of the one frame image detected, based on the description of the pattern file.

Figure 3:
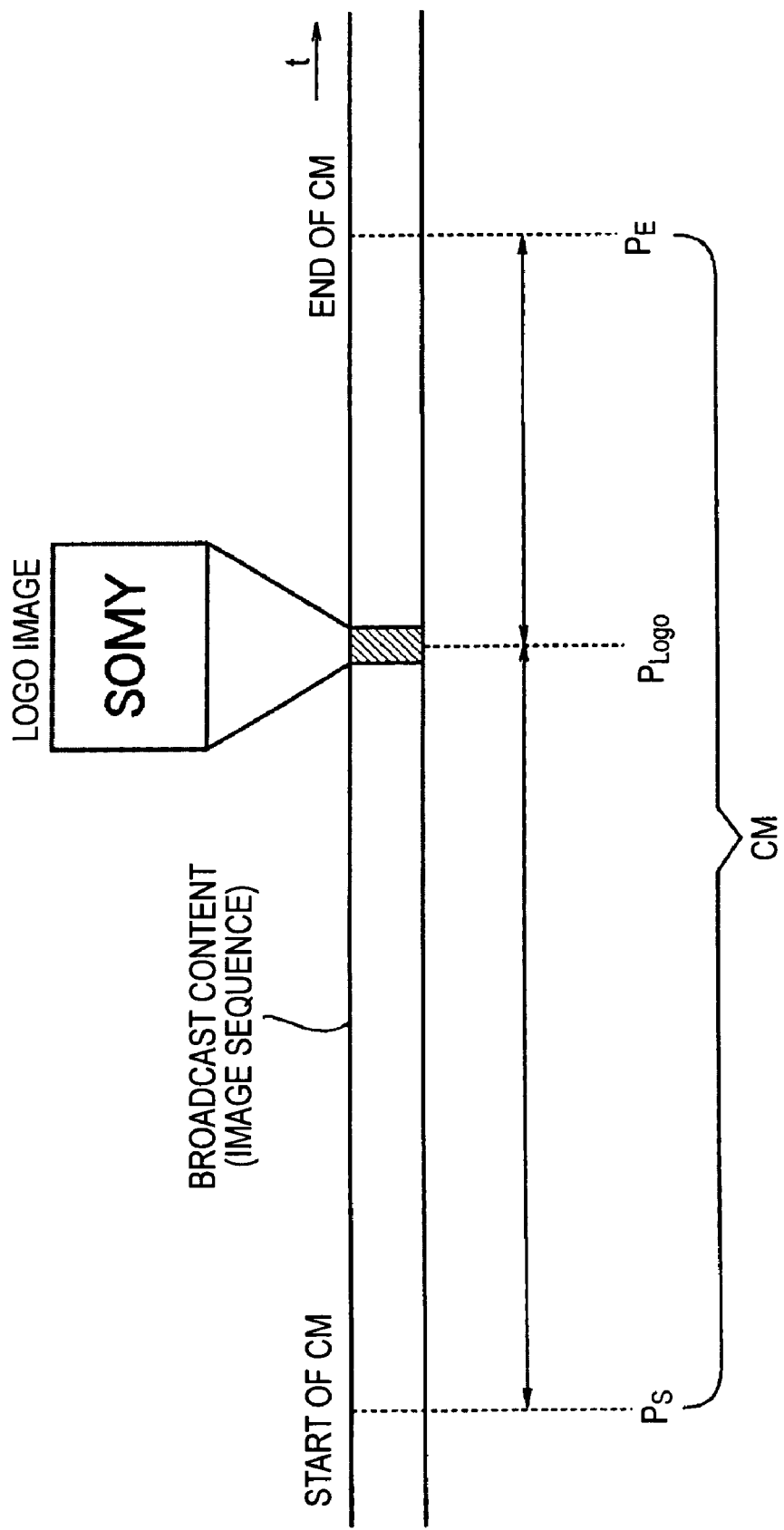
FIG. 3 illustrates a specific example of a CM start position and a CM end position.

FIG. 3 illustrates a specific example of the start position and the end position of the CM.

As shown in FIG. 3, the images of the broadcast content are recognized in the order of display, frame by frame. For example, one frame image displaying "SOMY" (hereinafter referred to as a logo image) of FIG. 2 is detected at position $P_{Logo}$ as a result of comparison of the recognized one frame image with the logo image specified in the pattern file. The start position of the CM is described with respect to the position $P_{Logo}$ of the logo image in the pattern file. More specifically, the start position of the CM is described as being in the number of frames or in seconds earlier than $P_{Logo}$. The information processing apparatus 1 thus identifies the start position of the CM as position $P_S$.

Similarly, the end position of the CM is described in the number of frames or seconds later than the position $P_{Logo}$ of the logo image in the pattern file. The information processing apparatus 1 thus identifies the end position of the CM as position $P_E$.

The start position and the end position of the CM are identified in this way, and metadata representing the identified start position $P_S$ and the end position $P_E$ of the CM is generated.

One pattern file works as a hint for the information processing apparatus 1 to extract a CM represented by the start position and the end position.

The generated metadata is used when a CM is skipped during playback of the broadcast content or when a television program (host program) is recorded without CM onto the removable medium 20, such as a digital versatile disk (DVD).

When the start position and the end position of the CM of FIG. 3 are identified, a portion extending from the position $P_S$ to the position $P_E$ is skipped without being played back, or the broadcast content except the portion extending from the position $P_S$ to the position $P_E$ (a portion prior to the position $P_S$ and a portion subsequent to the position $P_E$) is stored onto the removable medium 20.

After the logo image is detected, the information processing apparatus 1 simply identifies the position of the CM in accordance with the description of the pattern file. The information processing apparatus 1 thus determines the positions of the CM in a more reliable manner than the known technique in which one of a mute period and a scene change is detected and 15 seconds or 30 seconds subsequent to the one of the mute period and the scene change are treated as a CM portion.

If one of the detected mute period and scene change is present within the CM, an erroneous position of the CM is identified in accordance with the known art because a portion of the television program in the broadcast content is also taken into consideration in the position identification. Such an erroneous identification is prevented in the embodiments of the present invention.

A series of process steps of the information processing apparatus 1 identifying the position of the CM will be described later with reference to flowcharts.

Figure 4:
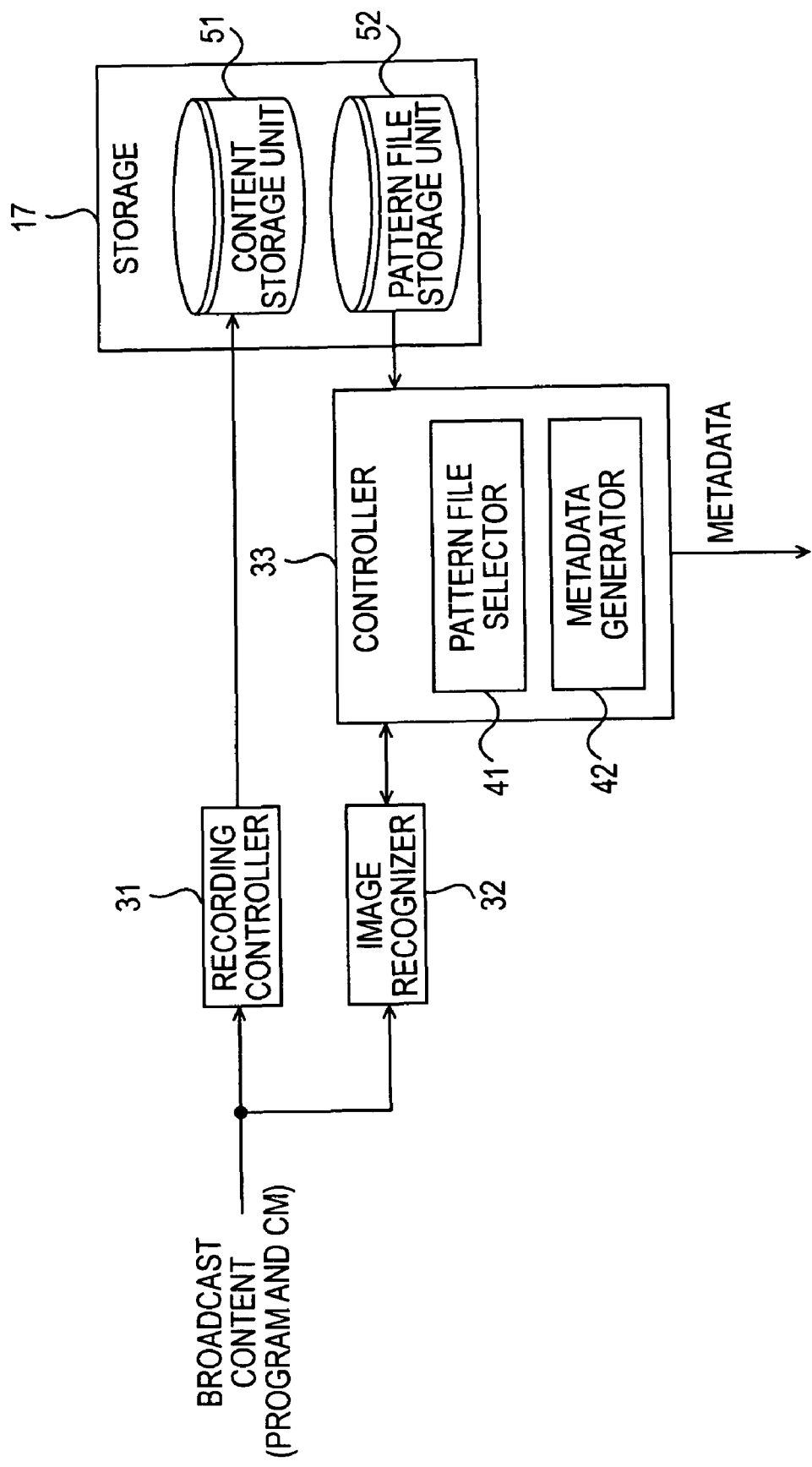
FIG. 4 is a functional block diagram of the information processing apparatus.

FIG. 4 is a functional block diagram of the information processing apparatus 1. At least part of the functions of FIG. 4 is performed by the CPU 11 of FIG. 1 in accordance with a predetermined program.

A recording controller 31 controls a content receiver 16 to select a predetermined broadcast content, and causes a content storage unit 51 in the storage 17 to store the selected broadcast content (containing an audio and video).

An image recognizer 32 acquires images (image sequence) of the broadcast content supplied from the content receiver 16, and determines in a matching process whether the logo image specified by the pattern file supplied from the controller 33 is contained in an image of one frame of interest. For example, in the matching process of the image recognizer 32, a predetermined portion of the image of one frame of interest is extracted in accordance with the description of the pattern file to heighten matching accuracy and lighten workload, and a mask process is performed on the extracted portion of the image. The matching process is performed on the resulting image and the logo image.

If the image recognizer 32 determines that the logo image specified by the pattern file is contained in the image of one frame of interest, in other words, if the logo image is detected, information representing the position of the logo image is output to the metadata generator 42.

The image supplied to the image recognizer 32 can be the one that is temporarily stored in the content storage unit 51, and then read at a predetermined timing.

The controller 33 includes a pattern file selector 41 and the metadata generator 42.

The pattern file selector 41 selects the pattern files stored in the pattern file storage unit 52 one by one, and outputs the selected pattern file to the image recognizer 32.

If the image recognizer 32 detects the logo image, the metadata generator 42 identifies the start position and the end position of the CM in accordance with the description of the pattern file (the description of the pattern file used in the detection of the logo image) with respect to the position of the logo image, and generates the metadata representing the identified start position and end position. The metadata generated by the metadata generator 42 is supplied to an external application program. The metadata is thus stored with the broadcast content associated therewith, used to play back the broadcast content (with the CM skipped), or to record the broadcast content (only the program portion is recorded).

The storage 17 includes the content storage unit 51 and the pattern file storage unit 52.

The content storage unit 51 stores the broadcast content supplied from the recording controller 31, and the pattern file storage unit 52 stores the pattern file on a per CM basis. For simplicity, it is assumed that a single logo image is contained in each of all CMs.

FIG. 5 illustrates the pattern file. The pattern file is described in XML (extensible Markup Language), for example.

A "CM title", an "extraction location", a "logo image", a "mask", a "CM start position", and a "CM end position" are described in the pattern file, for example.

The "CM title" is the title of the CM with the pattern file thereof representing the start position and the end position of the CM. The pattern file of the CM containing the image of FIG. 2 contains a description of a title "SOMY CM", for example.

The "extraction location" specifies the position (range) of extraction where a portion of an image of one frame of interest is extracted in the matching process of the image recognizer 32. For example, in the pattern file of the CM of the image of FIG. 2, the extraction location is specified as an area in a broken-line box containing the logo "SOMY".

The "logo image" is information specifying the logo image. For example, the pattern file of the CM of the image of FIG. 2 holds a file name storing the image of "SOMY".

Figure 6:
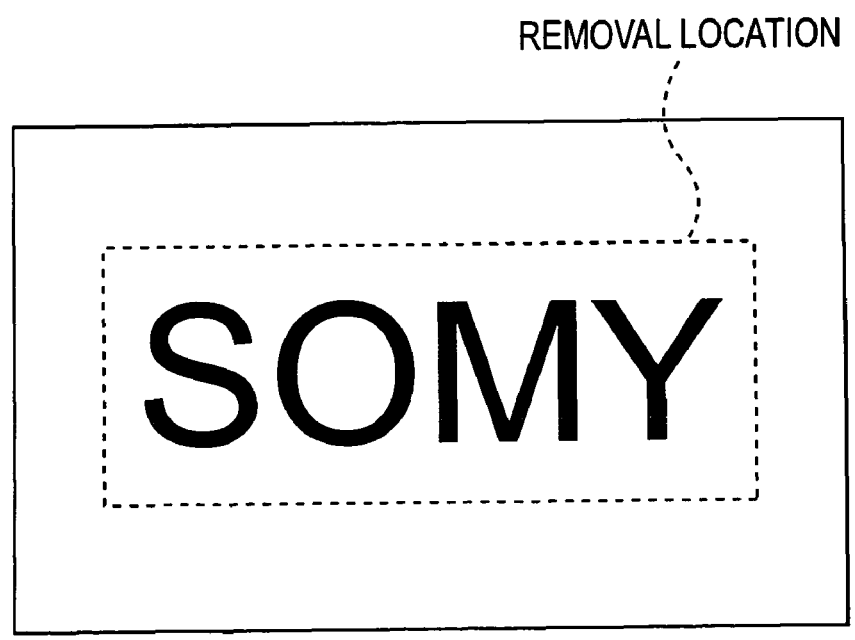
FIG. 6 illustrates an extraction location.

The "mask" specifies a mask image for extracting a portion other than the logo from the image extracted in accordance with the extraction location. For example, when the broken-line enclosed area of FIG. 6 is extracted, the background of the logo "SOMY" of the extracted area is extracted from the mask area, and the remaining logo and the logo image are compared in the matching process.

The "CM start position" is the CM start position that is determined with respect to the position of the logo image. The "CM end position" is the CM end position that is determined with respect to the position of the logo image. The CM start position and the CM end position are identified by the number frames, and time, for example.

The pattern file containing the above description is prepared on a per CM basis, and stored on the pattern file storage unit 52.

The operation of the information processing apparatus 1 is described below.

A series of process steps of the information processing apparatus 1 is described below with reference to a flowchart of FIG. 7.

In step S1, the information processing apparatus 1 performs a CM recognition process. In this process, the information processing apparatus 1 detects a logo image described in the selected pattern file from a broadcast content to be processed, and determines that the CM recognition is successful if the logo image is detected. The CM recognition process will be described in detail below with reference to a flowchart of FIG. 8.

The information processing apparatus 1 determines in step S2 whether the CM recognition is successful. If it is determined that the CM recognition is successful, processing proceeds to step S3. If the information processing apparatus 1 has detected the logo image specified in the selected pattern file, the CM recognition is considered to be successful.

In step S3, the information processing apparatus 1 performs a CM extraction process. In the CM extraction process, the information processing apparatus 1 generates the metadata representing the CM start position and the CM end position identified from the description of the pattern file with respect to the position of the logo image. The CM extraction process will be described in detail below with reference to a flowchart of FIG. 9.

If the CM extraction process is completed in step S3, or if it is determined in step S2 that the CM recognition is not successful, processing ends.

These processes are repeated to generate the metadata representing the start positions and the end positions contained in a single broadcast content to be processed.

Figure 7:
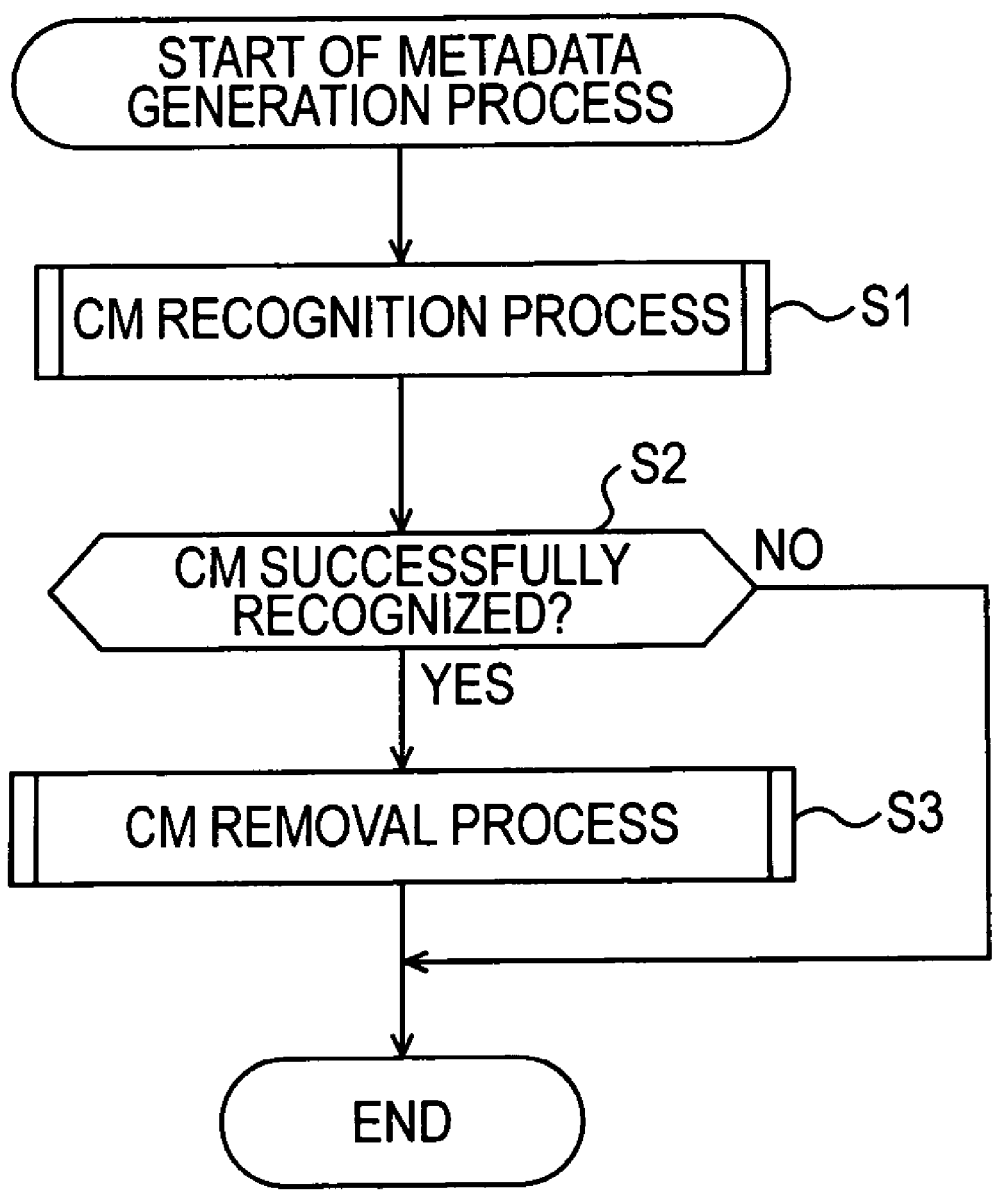
FIG. 7 is a flowchart illustrating a metadata generation process of the information processing apparatus.

The CM recognition process performed in step S1 of FIG. 7 is described below with reference to the flowchart of FIG. 8. The CM recognition process is performed in response to the input of each image of one frame.

In step S11, the pattern file selector 41 in the controller 33 selects one of the pattern files stored in the pattern file storage unit 52, and outputs the selected pattern file to the image recognizer 32.

In step S12, the image recognizer 32 recognizes one frame image of input frame images (one of an image of a television program and an image of a CM), and extracts a predetermined range of the recognized one frame image in accordance with the "extraction location" of FIG. 5 of the pattern file supplied from the pattern file selector 41.

In step S13, the image recognizer 32 performs a mask process on a portion of the image extracted in step S12 using a mask image specified by the "mask" in the pattern file.

In step S14, the image recognizer 32 matches the results obtained in the mask process in step S13 against the logo image specified by the "logo image" in the pattern file. In step S15, the image recognizer 32 determines whether the one frame image of interest matches the logo image of the CM having the start position and the end position thereof specified in the selected pattern file.

If it is determined in step S15 that the results obtained in the mask process fail to match the logo image, processing proceeds to step S16.

In step S16, the pattern file selector 41 determines whether all pattern files have been selected. If it is determined in step S16 that not all pattern files have been selected, processing returns to step S11 to repeat step S11 and subsequent steps.

If it is determined in step S16 that all pattern files have been selected, the pattern file selector 41 performs step S2 and subsequent steps of FIG. 7.

If the image of one frame of interest contains none of logo images specified by the pattern files, the image of one frame of interest can be one of an image of a television program and an image of the CM other than the logo image. The start position and the end position of the CM cannot be identified from the description of the pattern file with respect to the image of interest, and the CM recognition is determined as being a failure in step S2 of FIG. 7. Processing thus ends.

If it is determined in step S15 that the results obtained from the mask process match the logo image, the image recognizer 32 proceeds to step S17. The image recognizer 32 determines that the CM (with the start position and the end position thereof identified in the currently selected pattern file) has been successfully recognized. The image recognizer 32 thus notifies the metadata generator 42 that the logo image has been detected.

Processing proceeds to step S2 of FIG. 7 to determine that the CM recognition is successful. In step S3, the CM extraction process is performed.

Since the range of matching of the logo image is narrowed by the "extraction location" in the pattern file, matching accuracy is high in comparison with the case in which the entire image of one frame of interest is matched against the entire logo image of FIG. 2. Since the color, etc. of the logo is additionally specified by the "logo image" in the pattern file, matching accuracy is higher than the case in which only both the shape and size of the logo are specified and the matching process is performed as to whether the image of interest contains a logo having the specified shape and size.

Figure 9:
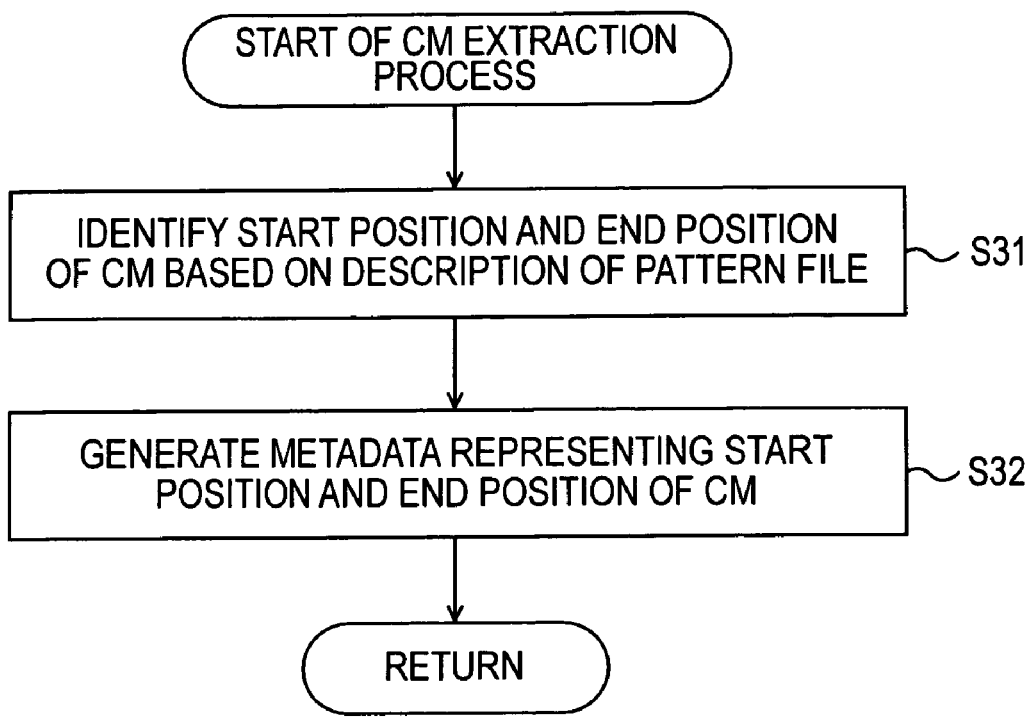
FIG. 9 is a flowchart illustrating a CM extraction process performed in step S3 of FIG. 7.

The CM extraction process performed in step S3 of FIG. 7 is described below with reference to the flowchart of FIG. 9.

Figure 8:
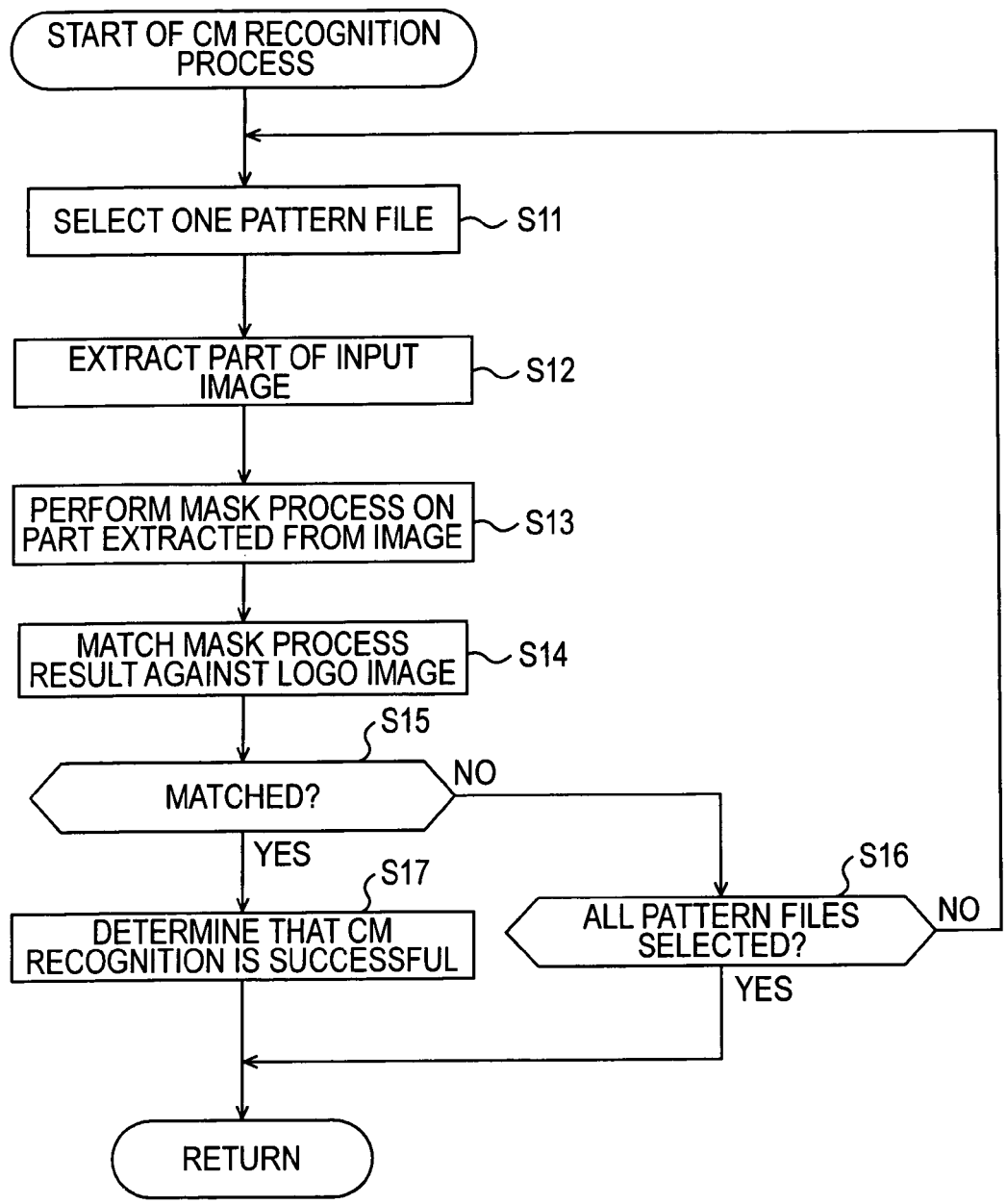
FIG. 8 is a flowchart illustrating a CM recognition process performed in step S1 of FIG. 7.

In step S31, the position identifier 42 in the controller 33 identifies the CM start position and the CM end position based on the description of the "CM start position" and the "CM end position" with respect to the position of the logo image detected by the image recognizer 32 in the pattern file (selected in step S11 of FIG. 8).

In step S32, the metadata generator 42 generates the metadata representing the CM start position and the CM end position, identified in step S31. The generated metadata is then output to the external application program. A metadata generation process ends, and processing returns to step S3 of FIG. 7.

In this way, one logo image contained in the CM is detected. The start position and the end position of the CM are identified in accordance with the position of the logo image and the description of the pattern file. The information processing apparatus 1 thus detects the position of the logo image accurately, thereby identifying the start position and the end position of the CM by the unit of frame at a high accuracy level.

In the image matching process, the position of the logo image serving as a reference for identifying the start position and the end position of the CM is detected. The start position and the end position of the CM are identified in accordance with the detected position and the description of the pattern file. An audio matching process can also be used. In the audio matching process, the position of an audio within a predetermined period of time lasting in the CM specified by the pattern file is detected. The start position and the end position of the CM are then identified in accordance with the position of the detected audio and the description of the pattern file.

Described in the pattern file is information matched between the broadcast content and the audio, including a characteristic effect sound emitted at a predetermined CM timing, such as a "chime sound", audio information specifying the background music on the air, and information representing the start position and the end position of the CM with reference to the position of the audio. The audio serving as a reference for identifying the start position and the end position of the CM is referred to as a reference sound.

Figure 10:
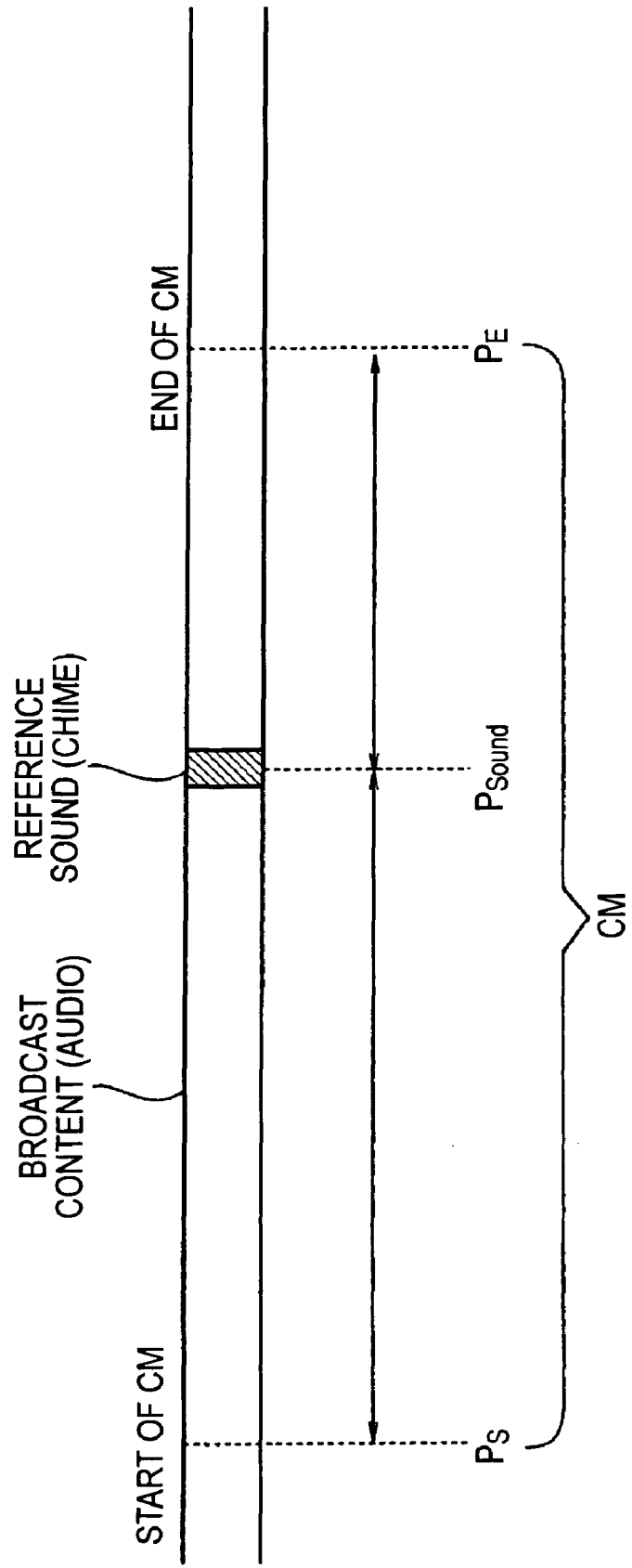
FIG. 10 illustrates another example of the CM start position and the CM end position.

As shown in FIG. 10, the information processing apparatus 1 repeats a matching process between the audio repeated every predetermined period of time in the broadcast content and the reference sound specified in the pattern file ("chime sound" in FIG. 10). If a reference sound is detected at position $P_{Sound}$ in the matching process, the start position of the CM is described as being in seconds earlier than $P_{Sound}$ as the reference sound in the pattern file. The information processing apparatus 1 thus identifies the start position of the CM as position $P_S$.

Similarly, the end position of the CM is described as being in seconds later than $P_{Sound}$ as the reference sound in the pattern file. The information processing apparatus 1 thus identifies the end position of the CM as position $P_E$.

The start position and the end position of the CM are thus identified with respect to the audio.

Figure 11:
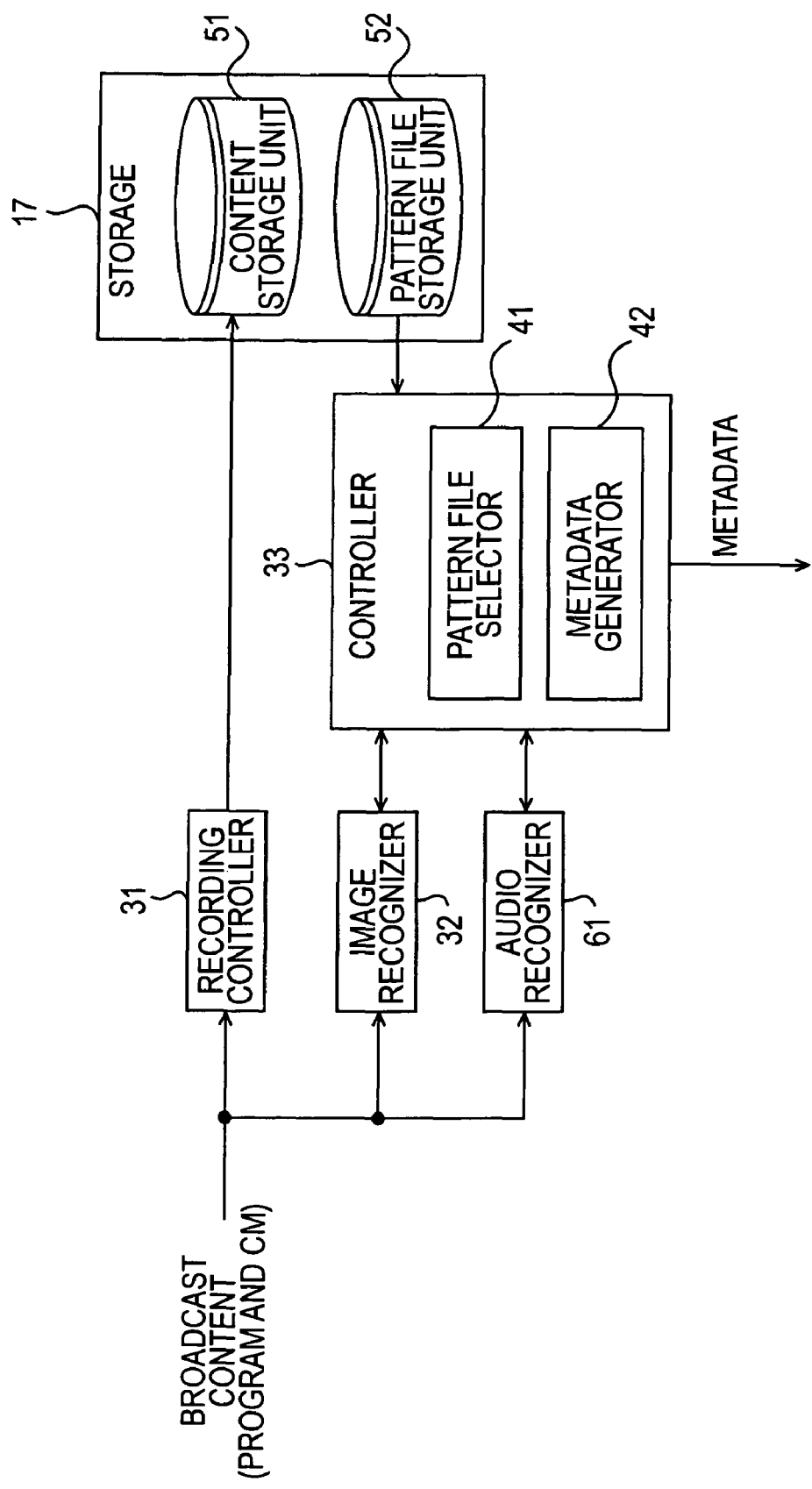
FIG. 11 is a functional block diagram illustrating an information processing apparatus in accordance with another embodiment of the present invention.

FIG. 11 is a functional block diagram of an information processing apparatus 1 in accordance with another embodiment of the present invention.

The information processing apparatus 1 of FIG. 11 is identical in structure to the information processing apparatus 1 of FIG. 4 except that an audio recognizer 61 is included. The discussion of elements previously discussed with reference to FIG. 4 are omitted herein.

The audio recognizer 61 acquires audio of the broadcast content supplied from the content receiver 16, recognizes a sound repeated at every predetermined period out of the acquired audio, and determines whether the recognized sound matches the reference sound specified by the pattern file supplied from the pattern file selector 41.

If the audio recognizer 61 determines that the recognized sound at every predetermined period of time matches the reference sound, in other words, if the reference sound is detected, information representing the position of the reference sound is output to the metadata generator 42.

The pattern file selector 41 selects the pattern files stored in the pattern file storage unit 52 one by one, and outputs the selected pattern file to the audio recognizer 61. The pattern file storage unit 52 stores, on a per CM basis, the information specifying the reference sound of each CM, and the pattern file describing the start position and the end position of the CM with respect to the position of the reference sound.

When the audio recognizer 61 detects the reference sound, the metadata generator 42 identifies the start position and the end position of the CM with reference to the position of the reference sound in accordance with the description of the pattern file, and generates the metadata representing the identified start position and end position of the CM.

A CM recognition process performed by the information processing apparatus 1 of FIG. 11 is described below with reference to a flowchart of FIG. 12. The CM recognition process is performed in step S1 of FIG. 7.

In step S41, the pattern file selector 41 in the controller 33 selects the pattern files stored in the metadata generator 42 one by one, and outputs the selected pattern file to the audio recognizer 61.

In step S42, the audio recognizer 61 recognizes the sound repeated at every predetermined period of time of the input audio (one of the audio of the television program and the audio of the CM), and matches the recognized sound with the reference sound specified in the pattern file.

In step S43, the audio recognizer 61 determines whether the recognized sound matches the reference sound. If it is determined that the recognized sound fails to match the reference sound, processing proceeds to step S44.

In step S44, the pattern file selector 41 determines whether all pattern files have been selected. If it is determined that not all pattern files have been selected, processing returns to step S41 to repeat step S41 and subsequent steps.

If it is determined in step S44 that all pattern files have been selected, the pattern file selector 41 proceeds to step S2 and subsequent step of FIG. 7.

If it is determined in step S43 that the recognized sound matches the reference sound specified in the pattern file, processing proceeds to step S45. The audio recognizer 61 determines that the CM recognition has been successful, and then notifies the metadata generator 42 that the reference sound has been detected.

Processing proceeds to step S2 of FIG. 7. After it is determined that the CM recognition has been successful, the CM extraction process in step S3 is performed. In step S3, the start position and the end position of the CM are identified with respect to the position of the detected reference sound in accordance with the description of the pattern file, and the metadata representing the start position and the end position of the CM is thus generated.

In addition to the image matching, the information processing apparatus 1 performs the audio matching process to detect the audio in the CM specified in the pattern file. The information processing apparatus 1 thus accurately detects the position of the reference sound, thereby identifying the start position and the end position of the CM at a high accuracy level.

In the above discussion, the matching process of matching the logo image against all images of the broadcast content is performed. A scene change is present at each of the beginning and the end of the CM, in other words, a scene change is present in the vicinity of the CM to be matched. If information specifying an image for matching is described as being in frames or seconds later than the detection of a scene change, the information processing apparatus 1 simply performs the matching process with the logo image against only the image specified by the pattern file. Workload on the information processing apparatus 1 is substantially reduced in comparison with the case in which the matching process is performed on all images.

Figure 13:
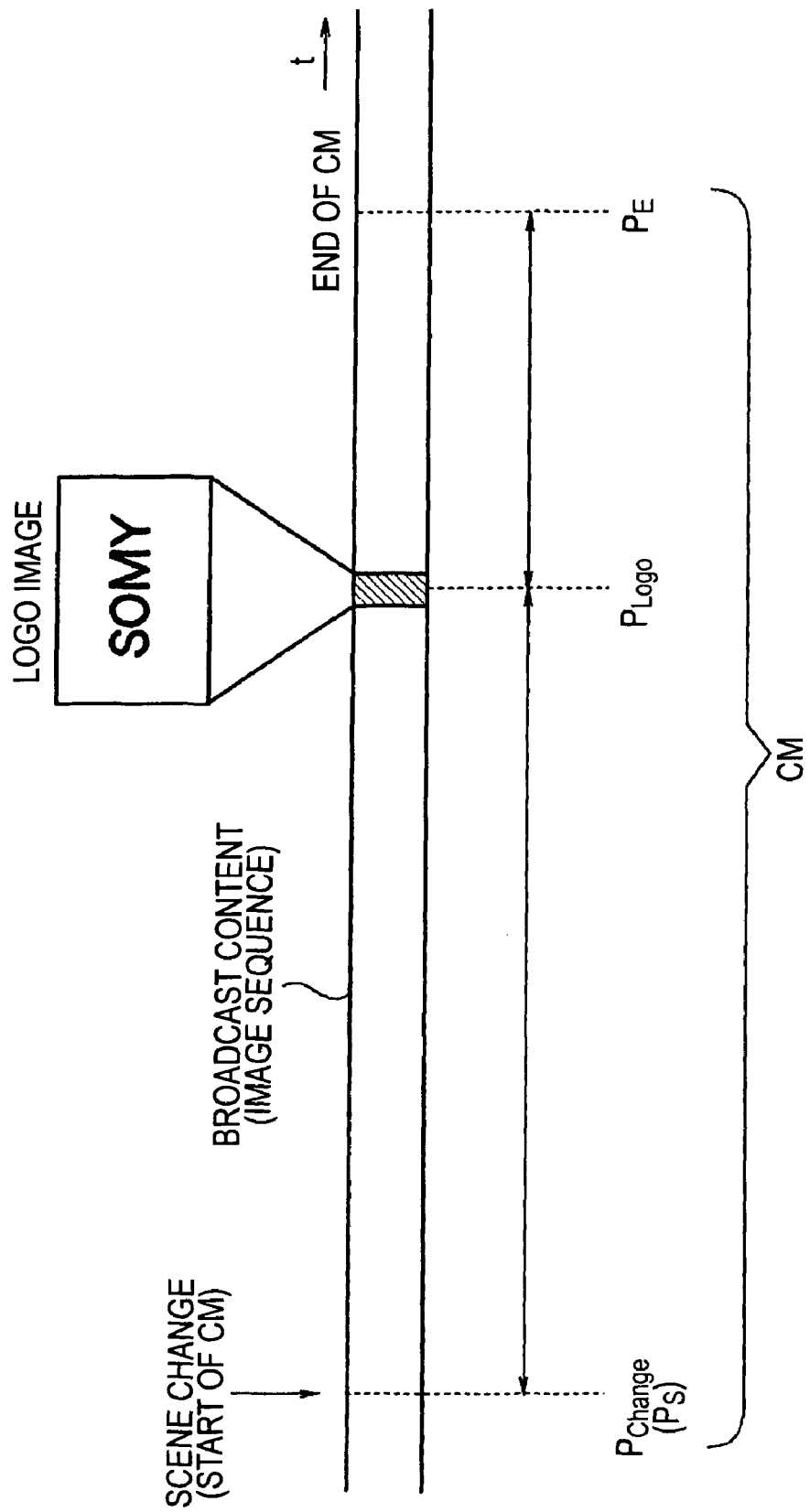
FIG. 13 illustrates yet another example of the CM start position and the CM end position.

FIG. 13 illustrates another specific example of the start position and the end position of the CM.

The information processing apparatus 1 successively detects scene changes from the start of the broadcast content.

A scene change is detected at position $P_{Change}$ as shown in FIG. 13. Since the position of the logo image of the CM is described as being in the number of frames or seconds after the position $P_{Change}$ in the pattern file, the information processing apparatus 1 performs the matching process of the logo image (specified in the pattern file) against the image at the position specified in the pattern file.

The image at the position $P_{Logo}$ specified in the pattern file with respect to the position $P_{Change}$ of the scene change is detected as the logo image as shown in FIG. 13. As in the case in which all images are subjected to the matching process, the start position of the CM is described as being in the number of frames or seconds before the position $P_{Logo}$ in the pattern file.

The information processing apparatus 1 thus identifies the start position of the CM as position $P_S$ ($P_S$=$P_{Change}$ in FIG. 3).

The end position of the CM is described as being in the number of frames or seconds after the position $P_{Logo}$ in the pattern file. The information processing apparatus 1 thus identifies the end position of the CM as position $P_E$.

The start position and the end position of the CM are identified, and the metadata representing the identified start position $P_S$ and end position $P_E$ is thus generated.

Since the information processing apparatus 1 performs the matching process on only the image at the position specified in the pattern file with respect to the detected position of the scene change (the image from which the logo image is detected), the range of the matching process is narrowed. Workload involved is lighter than in the case in which the matching process is performed on all images. Matching accuracy is heightened.

After detecting the logo image in the matching process, the information processing apparatus 1 simply identifies the position in accordance with the description of the pattern file. The position of the CM is thus identified as reliably as when all images are subjected to the matching process.

Figure 14:
FIG. 14 illustrates another pattern file.

FIG. 14 illustrates the pattern file in which the image to be matched is specified with respect to the position of the scene change.

The pattern file of FIG. 14 is identical to the pattern file of FIG. 5 except that the "position of the logo image" is added. The "position of the logo image" is the one represented with respect to the position of the scene change.

The "position of the logo image" is represented taking into consideration the number of scene changes with respect to the position of the detected scene change, for example, as being later than the position of the detected scene change by a length of time expressed in the number of scene changes and the number of frames. The "position of the logo image" can also be represented as being earlier than the position of the scene change by a length of time expressed in the number of frames or seconds.

If the image for matching is specified with respect to the position of the scene change, the "CM start position" and the "CM end position" are represented with respect to the position of the detected scene change (for example, the position $P_{Change}$ of FIG. 13) rather than the position of the logo image (for example, the position $P_{Logo}$ of FIG. 13).

Figure 15:
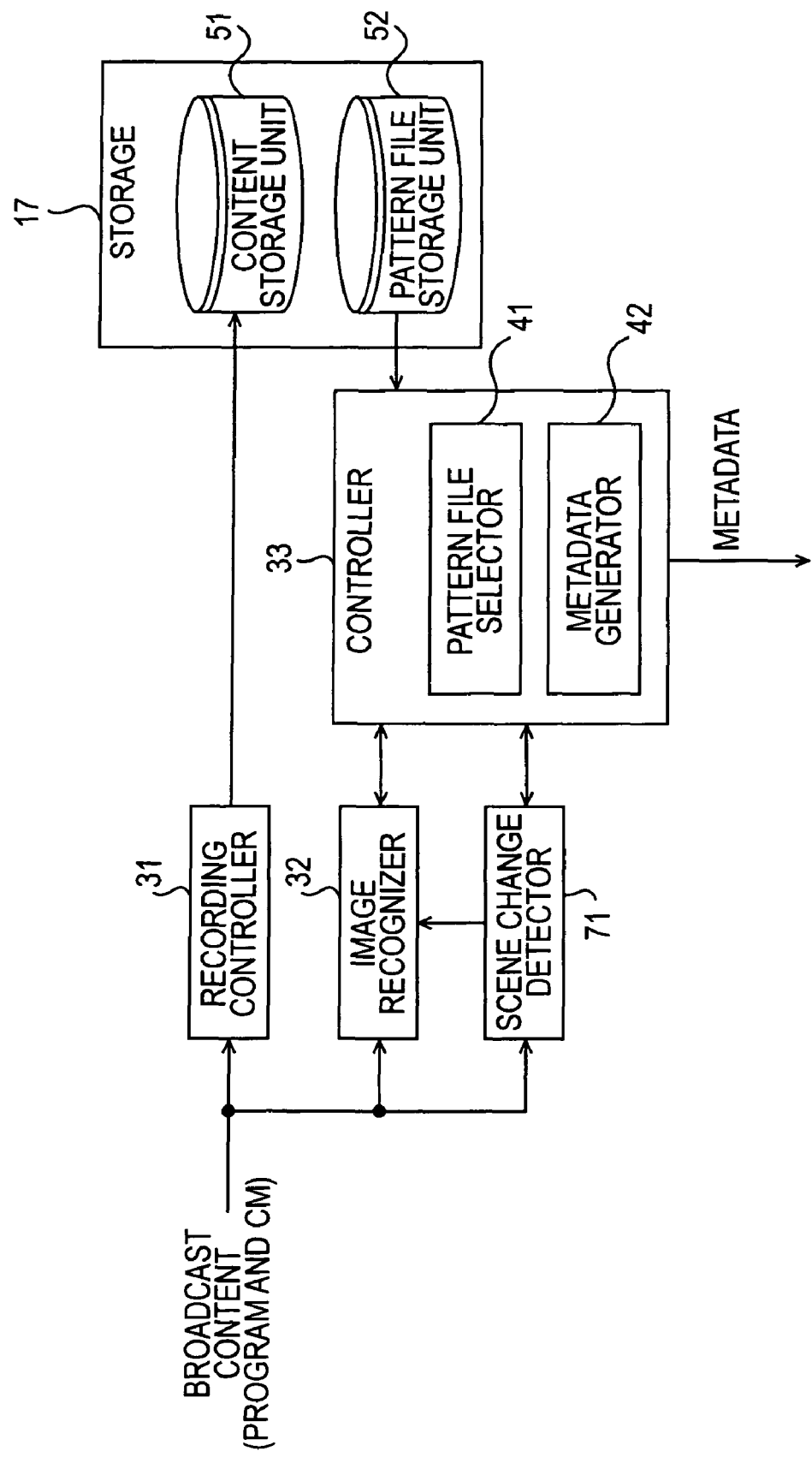
FIG. 15 is a functional block diagram of an information processing apparatus in accordance with yet another embodiment of the present invention.

FIG. 15 is a functional block diagram of an information processing apparatus 1 in accordance with another embodiment of the present invention.

The information processing apparatus 1 of FIG. 15 is identical in structure to the information processing apparatus 1 of FIG. 4 except that a scene change detector 71 is added. Elements previously discussed with reference to FIG. 4 are not discussed herein.

The scene change detector 71 acquires images (image sequence) of the broadcast content supplied from the content receiver 16 to detect a scene change. In the detection of the scene change, the scene change detector 71 determines whether a change in pixel value of each pixel of images between two consecutive frames is larger than a threshold. Upon detecting a scene change, the scene change detector 71 notifies the image recognizer 32, and the pattern file selector 41 in the controller 33 of the detection of the scene change. The notification from the scene change detector 71 contains information relating to the position of the scene change.

When the scene change detector 71 detects the scene change, the image recognizer 32 identifies, with respect to the position of the scene change, the image for matching based on the description in the pattern file supplied from the pattern file selector 41, and determines whether the identified image is a logo image. The determination results are output to the position identifier 42.

Figure 16:
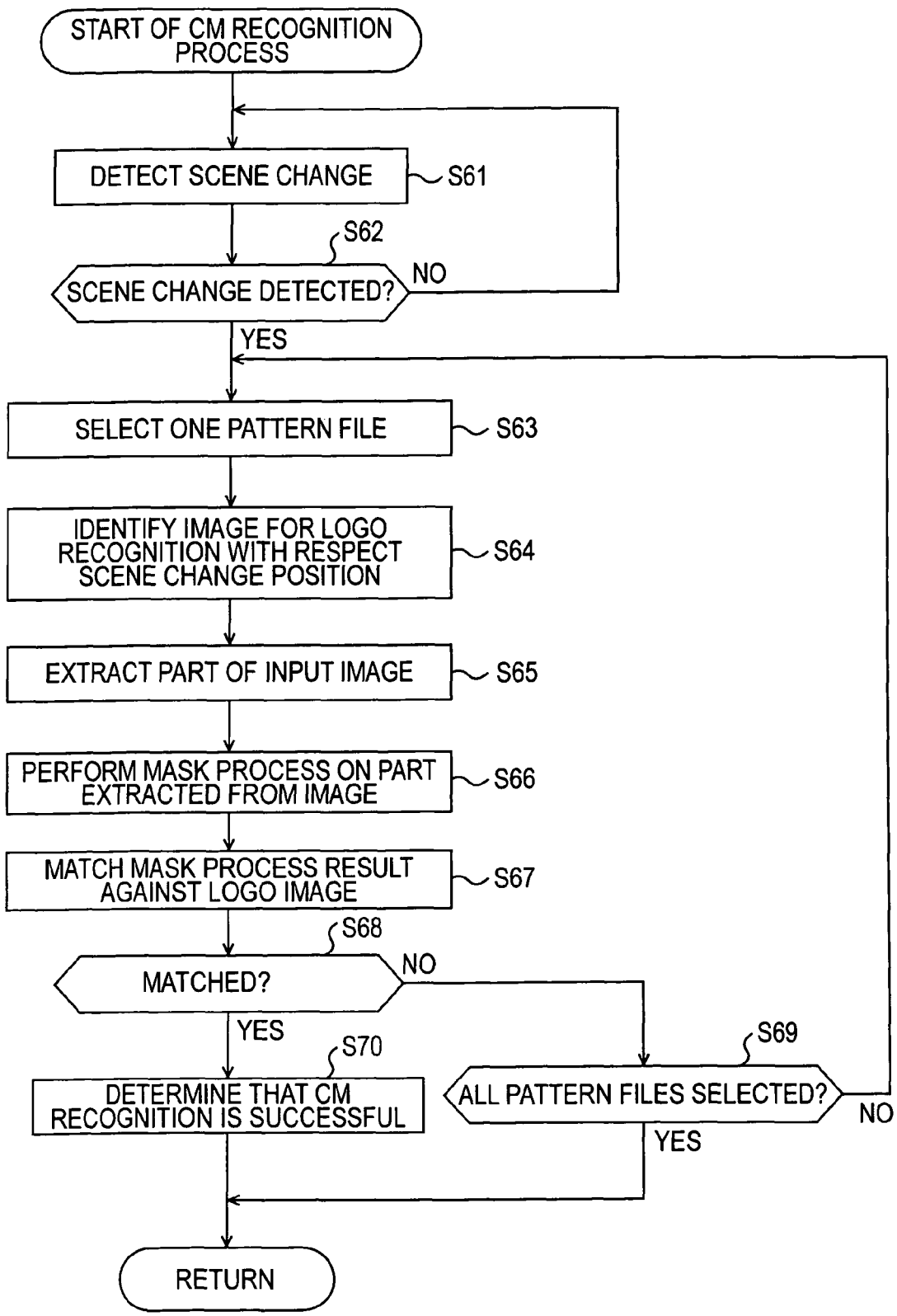
FIG. 16 is a flowchart illustrating a CM recognition process performed in step S1 of FIG. 7.

The CM recognition process performed by the information processing apparatus 1 of FIG. 15 is described below with reference to a flowchart of FIG. 16. The CM recognition process is performed in step S1 of FIG. 7.

In step S61, the scene change detector 71 detects a scene change in response to the inputting of images.

In step S62, the scene change detector 71 determines whether a scene change has been detected. If it is determined in step S62 that no scene change has been detected, processing returns to step S61 to repeat step S61 and S62. The process of the image recognizer 32 is not performed until a scene change is detected, and workload required to detect the logo image is thus reduced.

If the scene change detector 71 determines in step S62 that the scene change is detected, the scene change detector 71 notifies the image recognizer 32 and the pattern file selector 41 that the scene change has been detected.

In step S63, the pattern file selector 41 selects one of the pattern files stored in the pattern file storage unit 52, and outputs the selected pattern file to the image recognizer 32.

In step S64, the image recognizer 32 identifies the image for matching based on the description of the pattern file supplied from the pattern file selector 41 with respect to the position of the detected scene change. Processing proceeds to step S65.

Steps S65 and subsequent steps are respectively identical to step S12 and subsequent steps of FIG. 8. In step S65, part of the identified image is extracted. In step S66, a mask process is performed on the extracted portion of the image.

In step S67, the results of the mask process are matched against the logo image specified in the pattern file. It is determined in step S68 whether the results of the mask process match the logo image specified in the pattern file.

If it is determined in step S68 that the results of the mask process fail to match the logo image, processing proceeds to step S69. It is determined in step S69 whether all pattern files are selected. Step S63 and subsequent steps are repeated until it is determined that all pattern files have been selected. If the detected scene change does not serve as a reference for identifying the position of the logo image of the CM having the start position and the end position thereof represented in the pattern file (in other words if the scene change is not the one generated at the position $P_{Change}$), the image for logo recognition identified in step S64 from the selected pattern file is not a logo image. In this case, it is determined that the results of the mask process fail to match the logo image.

If it is determined in step S68 that the results of the mask process match the logo image, processing proceeds to step S70 to determine that the CM recognition has been successful. Process in step S2 of FIG. 7 is then performed.

The image for matching is specified in the pattern file with respect to the position of the scene change. The timing of the sound serving as a reference for matching can be specified in the pattern file with reference to the position of the scene change.

Figure 17:
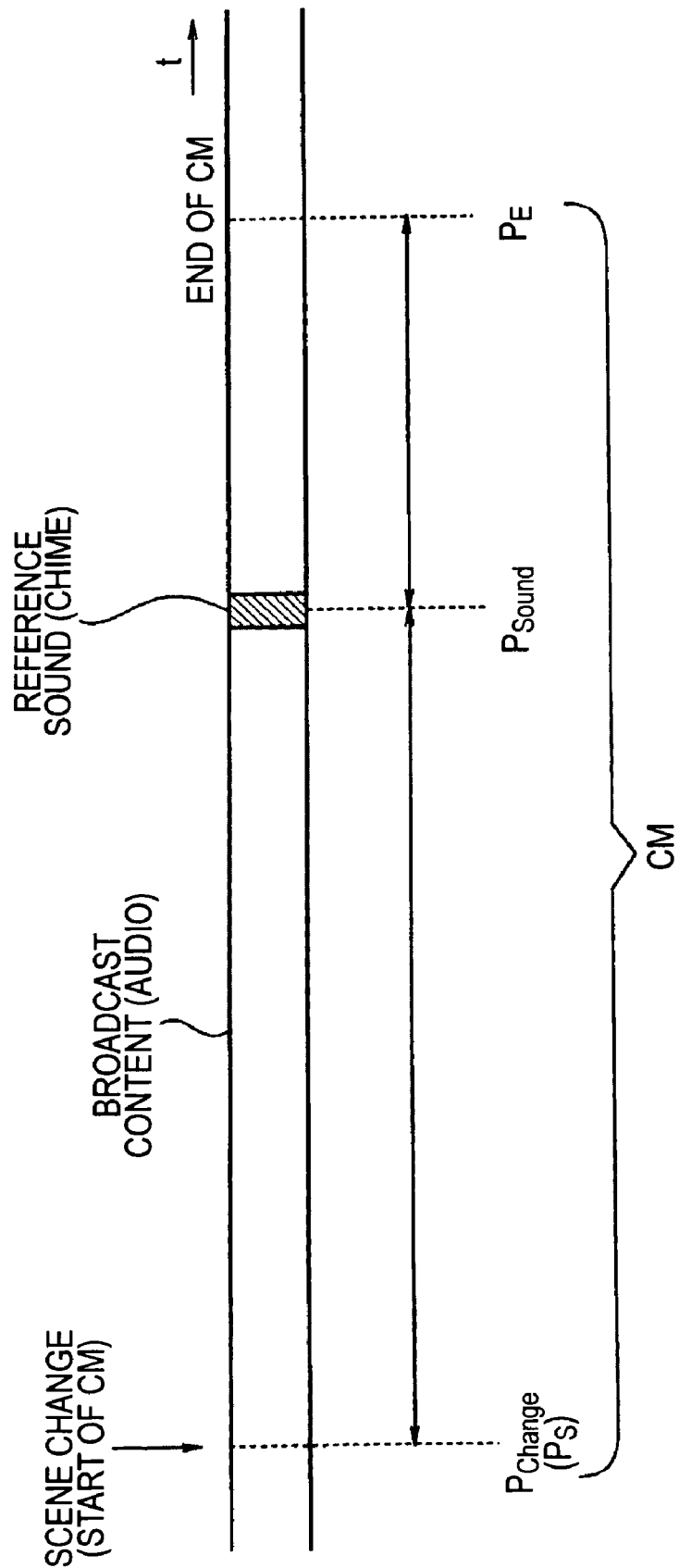
FIG. 17 illustrates a specific example of the CM start position and the CM end position.

FIG. 17 illustrates another specific example of the start position and the end position of the CM.

A scene change is detected at position $P_{Change}$ as shown in FIG. 17. The position of the reference sound is described with respect to the position $P_{Charge}$ in the pattern file. More specifically, the reference sound of the CM is described as an audio at a timing in a predetermined number of seconds later than the position $P_{Charge}$. The information processing apparatus 1 matches the audio at the timing specified in the pattern file against the reference sound (specified in the pattern file).

For example, if the sound at the position $P_{Sound}$ specified in the pattern file with respect to the position $P_{Change}$ of the scene change is the reference sound specified in the pattern file ("chime" in FIG. 17), the start position of the CM is described with respect to the position of the reference sound $S_{Sound}$ in the pattern file, more specifically, as being earlier than the position of the reference sound $P_{Sound}$ by the predetermined number of seconds. The information processing apparatus 1 identifies the start position of the CM as position $P_S$ ($P_S=P_{Change}$ in FIG. 17).

The end position of the CM is described with respect to the position of the reference sound $P_{Sound}$ in the pattern file, more specifically, as being later than the position of the reference sound $P_{Sound}$ by a predetermine number of seconds. The information processing apparatus 1 identifies the end position of the CM as position $P_E$. Alternatively, the start position and the end position of the CM can be described in the pattern file with respect to the position $P_{Change}$ of the scene change.

The start position and the end position of the CM are thus identified, and the metadata representing the identified start position $P_S$ and end position $P_E$ of the CM is generated.

Figure 18:
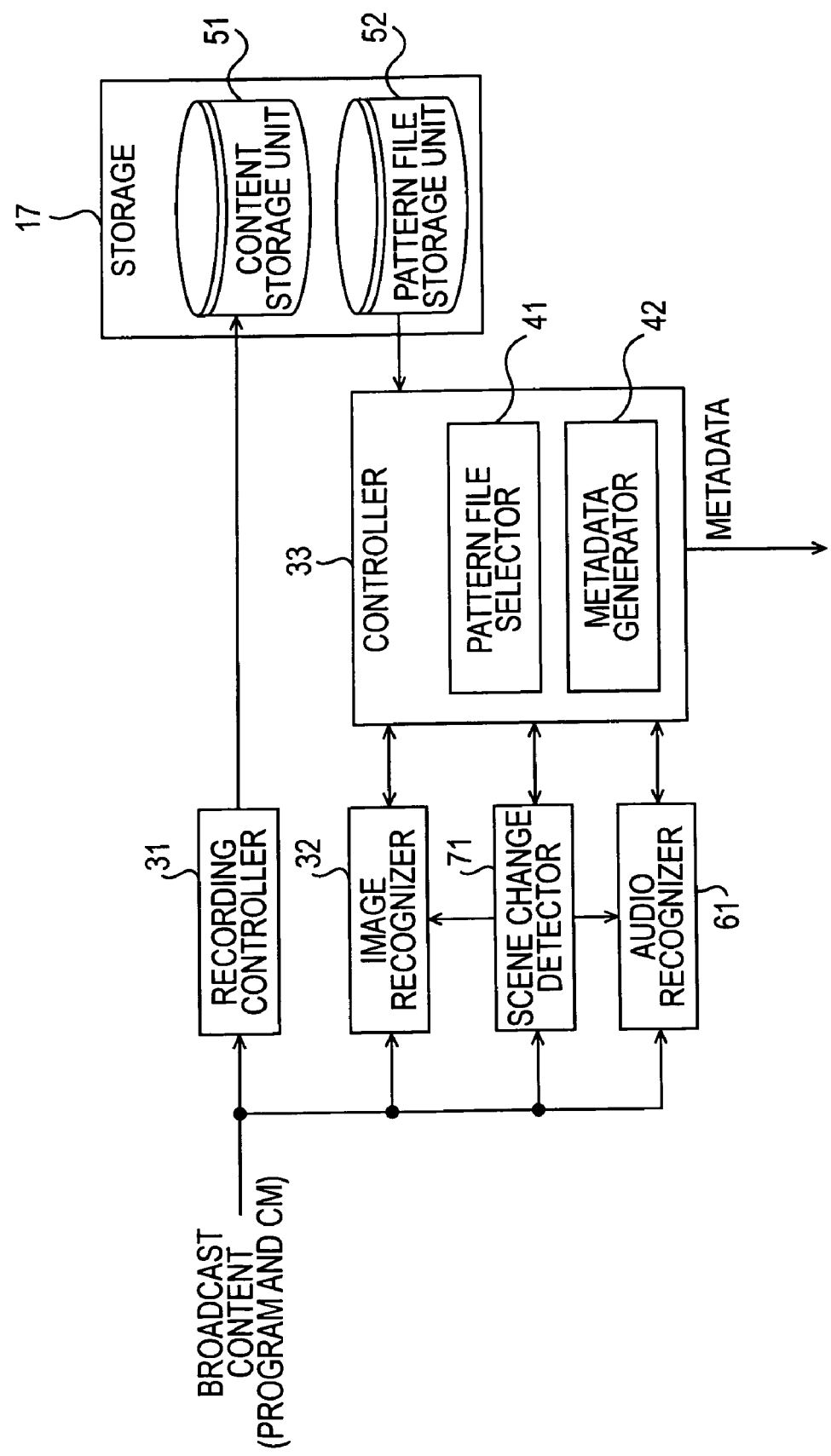
FIG. 18 is a functional block diagram of an information processing apparatus in accordance with still another embodiment of the present invention.

FIG. 18 is a functional block diagram of an information processing apparatus 1 in accordance with yet another embodiment of the present invention.

The information processing apparatus 1 of FIG. 18 is identical in structure to the information processing apparatus 1 of FIG. 15 except that an audio recognizer 61 is added. Elements previously discussed with reference to FIG. 15 are not discussed herein.

If the scene change detector 71 detects a scene change, the audio recognizer 61 identifies the timing of the sound for matching in accordance with the description of the pattern file supplied from the pattern file selector 41, and determines whether the sound having the identified timing is a reference sound. The audio recognizer 61 notifies the metadata generator 42 of the determination results thereof.

Figure 19:
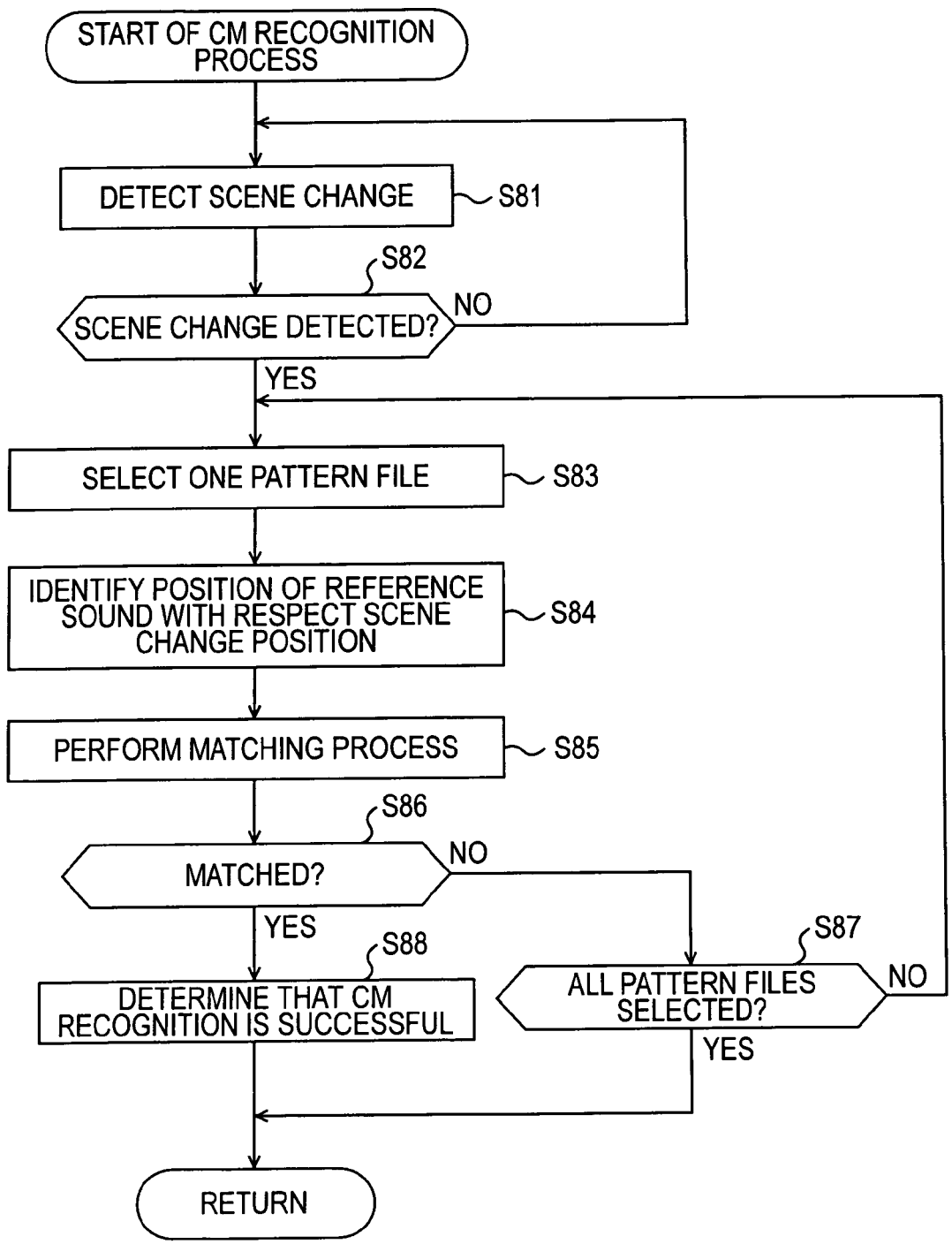
FIG. 19 is a flowchart illustrating a CM recognition process performed in step S1 of FIG. 7.

The CM recognition process performed by the information processing apparatus 1 of FIG. 18 is described below with reference to a flowchart of FIG. 19. The CM recognition process is performed in step S1 of FIG. 7.

In step S81, the scene change detector 71 detects a scene change in the supplied images in response to the inputting of audio to the audio recognizer 61.

The scene change detector 71 determines in step S72 whether a scene change has been detected. If it is determined in step S72 that no scene change has been detected, processing returns to step S81 to repeat S81 and S82. In this way, the process of the audio recognizer 61 is not performed until it is determined that a scene change is detected. Workload involved in the detection of the reference sound is thus reduced.

If it is determined in step S82 that a scene change has been detected, the scene change detector 71 notifies the audio recognizer 61 and the pattern file selector 41 that the scene change has been detected, and then proceeds to step S83.

In step S83, the pattern file selector 41 selects one of the pattern file stored in the pattern file storage unit 52, and outputs the selected pattern file to the audio recognizer 61.

In step S84, the audio recognizer 61 identifies, as a reference of the position of the detected scene change, the timing of the sound for matching in accordance with the description of the pattern file supplied from the pattern file selector 41. Processing proceeds to step S85.

Figure 12:
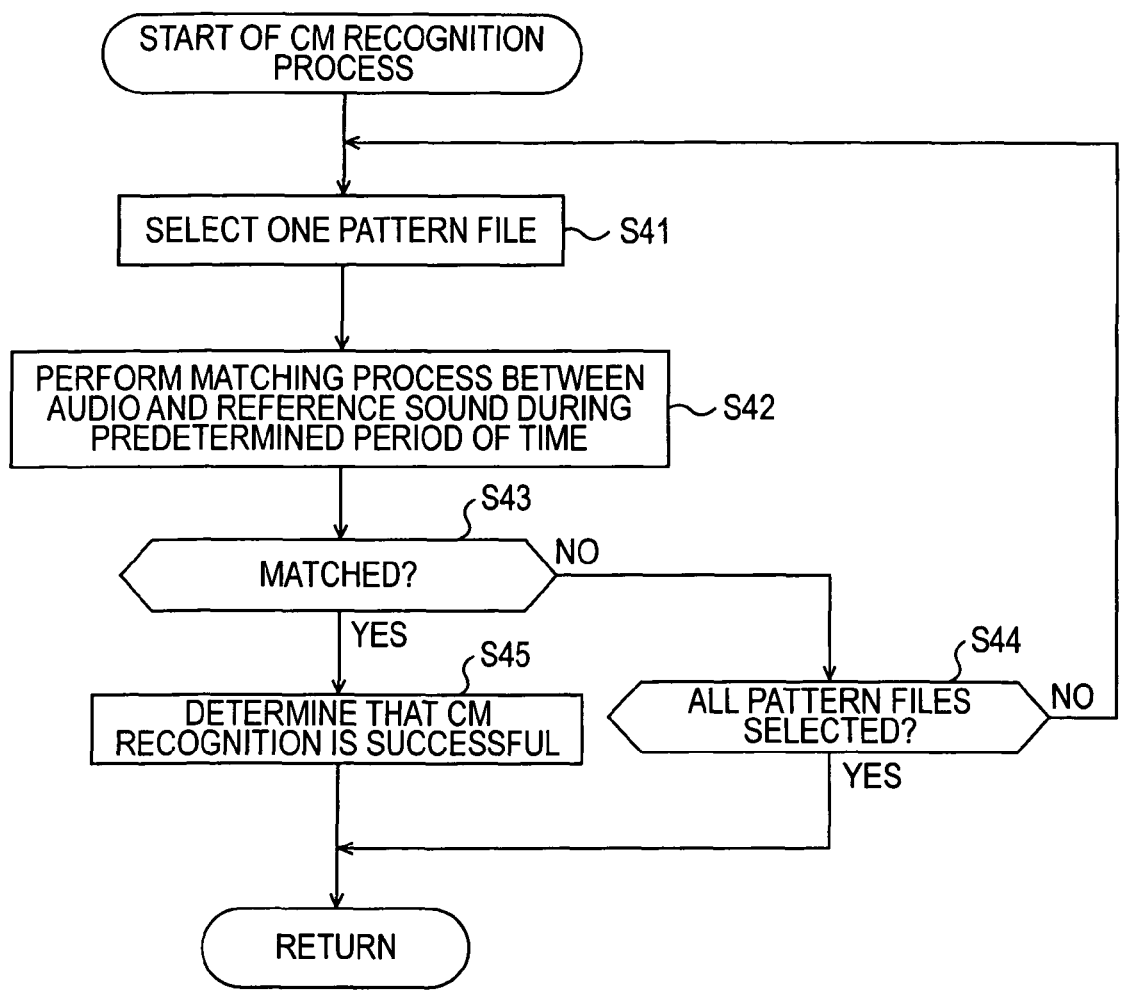
FIG. 12 is a flowchart illustrating another CM recognition process performed in step S1 of FIG. 7.

Step S85 and subsequent steps are respectively identical to step S42 and subsequent steps of FIG. 12. In step S85, the sound having the timing identified in step S84 is matched against the reference sound specified in the pattern file. It is then determined in step S86 whether both audios match each other.

If it is determined in step S86 that the sound having the timing identified in step S84 fails to match the reference sound, processing proceeds to step S87. It is determined in step S87 whether all pattern files have been selected. Step S83 and subsequent steps are repeated until it is determined that all pattern files have been selected.

If it is determined in step S86 that the sound at the timing identified in step S84 matches the reference sound, processing proceeds to step S88 to determine that the CM recognition has been successful. Step S2 and subsequent steps of FIG. 7 are then performed.

With the image for matching and the timing of the sound thus specified, the workload imposed on the information processing apparatus 1 is lighter than in the case in which the matching process is performed on sounds at all timings. Since the range of matching is narrowed, matching accuracy level is heightened.

In the above discussion, the scene change serves as the reference specifying the position for matching. A mute period present in the broadcast content can also serve as the reference specifying the position for matching.

The CM recognition accuracy is increased by specifying the position matching. The CM recognition accuracy is further increased by combining the CM recognition by image (CM recognition by detecting the logo image) and the CM recognition by audio (CM recognition by detecting the reference sound).

For example, a score (degree of match) representing the CM recognition results by image and a score representing the CM recognition results by audio are summed. It is then determined whether the resulting sum is above a predetermined threshold. If the resulting sum is above the predetermined threshold, the CM recognition is considered to be successful.

Figure 20:
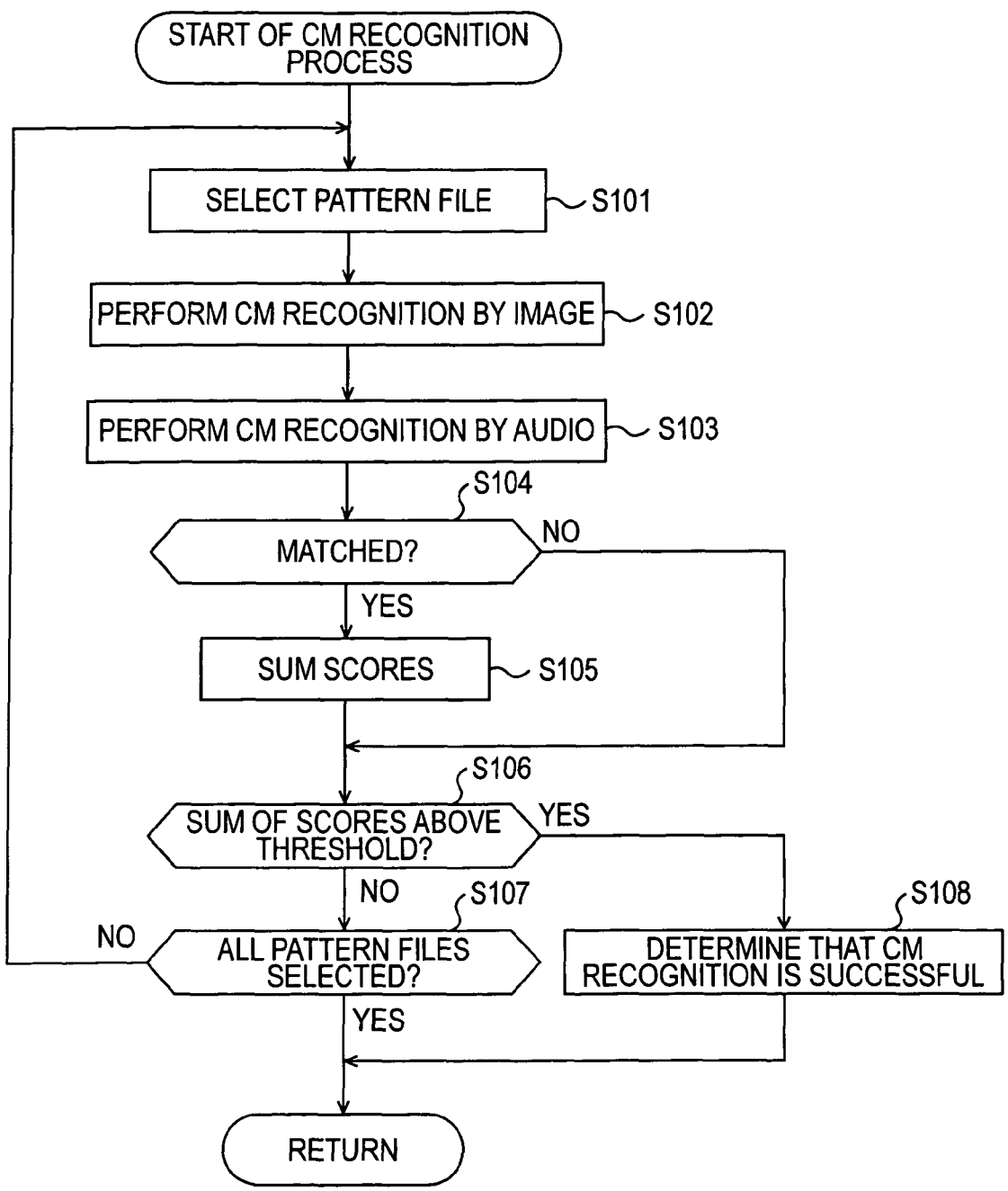
FIG. 20 is a flowchart illustrating a CM recognition process performed in step S1 of FIG. 7.

FIG. 20 is a flowchart illustrating the combination process of the information processing apparatus 1 (of FIGS. 11 and 18) that combines the CM recognition process by image and the CM recognition process by audio.

In step S101, the pattern file selector 41 selects a pattern file for performing the CM recognition process by image, and supplies the selected pattern file to the image recognizer 32. The pattern file selector 41 also selects a pattern file for performing the CM recognition process by audio, and supplies the selected pattern file to the audio recognizer 61. The pattern file supplied to the image recognizer 32 and the pattern file supplied to the audio recognizer 61 are related to the same CM.

In step S102, the image recognizer 32 performs the CM recognition process by image previously discussed with reference to each of FIGS. 8 and 16. The score representing the recognition results provided by the image recognizer 32 are output to the metadata generator 42 in the controller 33.

In step S103, the audio recognizer 61 performs the CM recognition process by audio previously discussed with reference to each of FIGS. 12 and 19. The recognition results provided by the audio recognizer 61 are also output to the metadata generator 42.

In step S104, the position identifier 42 determines, based on the scores supplied from the image recognizer 32 and the audio recognizer 61, whether the CM is recognized in both image and audio (a portion of the image successfully matching the logo image in the matching process of the image recognizer 32 and the sound of the match timing successfully matching the reference sound in the matching process of the audio recognizer 61). If it is determined that the CM is recognized, processing proceeds to step S105. If it is determined that the CM is not recognized, step S105 is skipped.

In step S105, the metadata generator 42 sums the score supplied from the image recognizer 32 and the score supplied from the audio recognizer 61, and proceeds to step 106. The metadata generator 42 determines whether the score sum is above the predetermined threshold.

If it is determined in step S106 that the score sum is not above the predetermined threshold, processing proceeds to step S107. The metadata generator 42 determines whether all pattern files have been selected.

If it is determined in step S107 that not all pattern files have been selected, the metadata generator 42 returns to step S101 to repeat step S101 and subsequent steps. If it is determined in step S107 that all pattern files have been selected, processing ends.

If it is determined in step S106 that the score sum is above the predetermined threshold, processing proceeds to step S108 to determine that the CM recognition is successful. Processing then proceeds to step S2 of FIG. 7.

By combining the CM recognition results provided by the image recognizer 32 and the CM recognition results provided by the audio recognizer 61, the overall CM recognition accuracy is increased even if individual recognition accuracy is not so much reliable.

The pattern file stored in the pattern file storage unit 52 can be updated with a pattern file that is regularly downloaded from a server. The data of CM broadcasting is changing from day to day. If the server prepares and downloads the update pattern file of the CM, the user can extract the newly broadcast CM from the broadcast content by downloading the update pattern file and handle the program and the CM separately.

Figure 21:
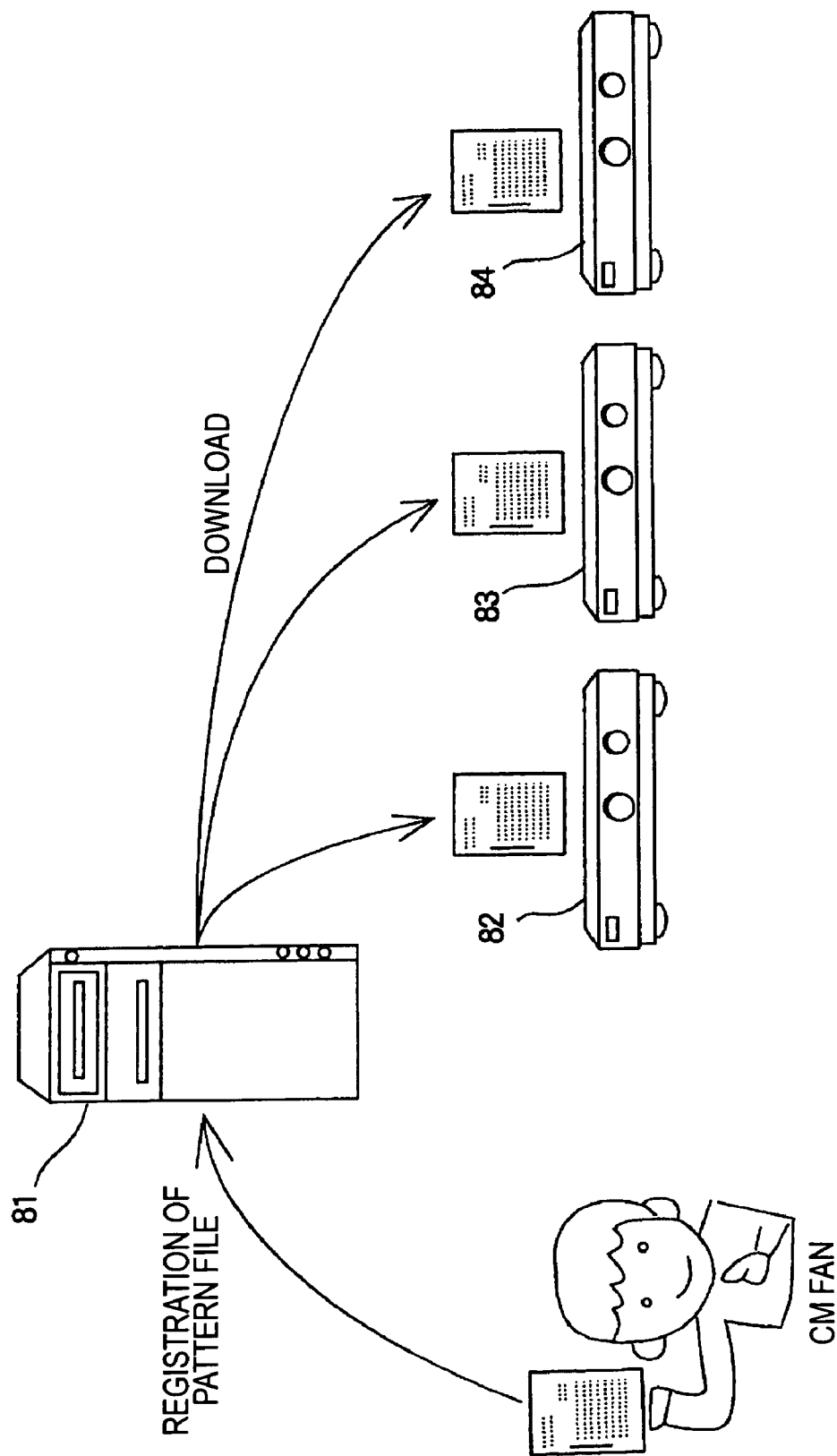
FIG. 21 illustrates the concept of a download system of the pattern file.

FIG. 21 illustrates the concept of a download system of the pattern file.

For example, a CM fan determines the start position and the end position with respect to the position of the logo image of the CM using the broadcast content recorded on the CM fan's own personal computer. The CM fan then produces a pattern file of FIGS. 5 and 14 containing information specifying the logo image and the position of the logo image.

Pattern files produced by many CM fans are registered in a server 81. The server 81 thus registers a variety of pattern files including update CMs.

Information processing apparatuses 82 through 84, each having the same structure as the information processing apparatus 1, download the pattern files from the server 81 with a predetermined period and stores the pattern files that can be used to extract a variety of CMs.

Not only the CM fans but also service providers can produce the pattern files so that the pattern files are downloaded from the server 81.

Figure 22:
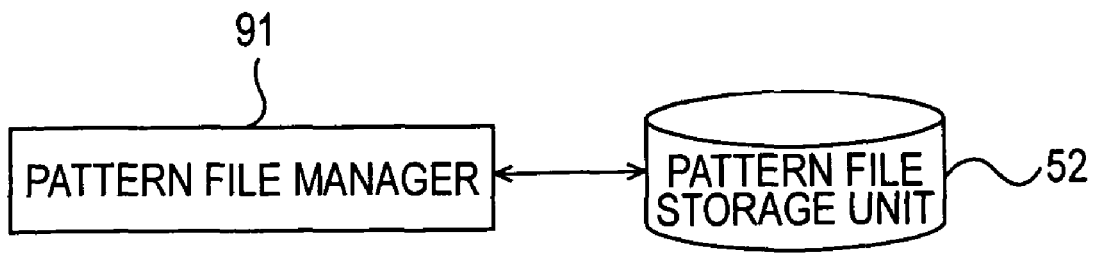
FIG. 22 is a functional block diagram illustrating an information processing apparatus in accordance with one embodiment of the present invention.

FIG. 22 is a functional block diagram illustrating the information processing apparatus 1 that manages downloading of the pattern file. The functional blocks of FIG. 22 are embodied by the CPU 11 of FIG. 1 that executes the predetermined program.

A pattern file manager 91 controls the communication unit 18 of FIG. 1, thereby accessing the server 81 via a network at a predetermined timing to download a pattern file not stored in the pattern file storage unit 52. The pattern file downloaded to the drive 19 is stored on the pattern file storage unit 52. In this way, the pattern files stored in the pattern file storage unit 52 are updated.

At predetermined timings, the pattern file manager 91 can successively delete pattern files of CMs no longer broadcast and not contained in a broadcast content stored in the content storage unit 51. This operation prevents the capacity of the storage 17 from being uselessly consumed by unused pattern files.

Figure 23:
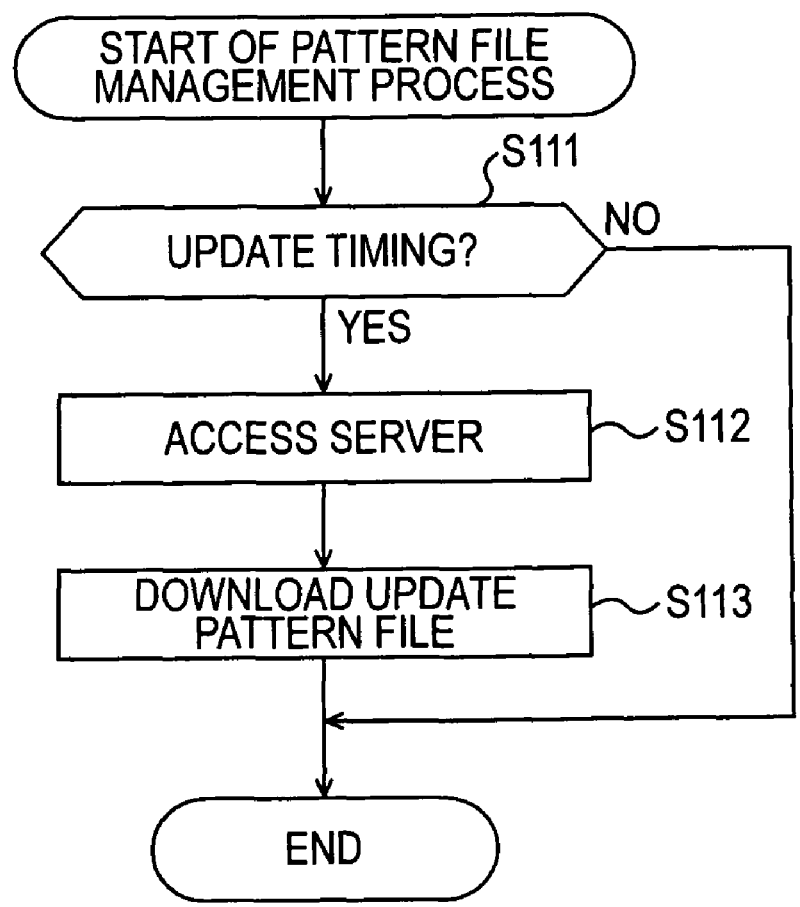
FIG. 23 is a flowchart illustrating a pattern file management process of the information processing apparatus.

A pattern file management process performed by the pattern file manager 91 is described below with reference to a flowchart of FIG. 23.

In step S111, the pattern file manager 91 determines whether it is timing to update the pattern file. If it is determined in step S111 that it is not timing to update the pattern file, processing ends. The pattern file manager 91 updates the pattern files at a predetermined timing, for example, once every day, or once every week.

If it is determined in step S111 that it is timing to update the pattern files, the pattern file manager 91 proceeds to step S112 to access the server 81.

In step S113, the pattern file manager 91 downloads update pattern files from the server 81, and causes the pattern file storage unit 52 to store the downloaded pattern files.

Since the pattern files of the update CMs are stored in the pattern file storage unit 52, even update CM can be extracted from the broadcast content.

In the above discussion, the image serving as a reference for identifying the position of the CM is the logo image. Any image representing the feature of a CM, such as an image of a performer's face displayed at a predetermined timing in the CM, an image of a product, a ticker other than the logo, can be used as a reference for identifying the position of the CM. In such a case, the pattern file specifies the image of the performer's face, the image of the product, and the ticker other than the log, etc.

Preferred as an image of one frame of a logo serving as a reference for identifying the position of the CM is the one that suddenly appears without any correlation in images before and after the current image instead of similar images gradually changing in time including a gradually approaching image from a far location and an image shifting into a more distinct state from a nearly transparent state thereof.

By detecting an image of one frame serving as a reference, the start position and the end position of the CM are identified with respect to the image at a high accuracy level. Similar images are present before and after the current image. If the detected position of the logo image of one frame serving as a reference is shifted by one frame or two frames, the start position and the end position of the CM identified accordingly are also shifted by one frame or two frames. Since an instantaneously displayed image having no correlation in images before and after the current image is used as a reference, the identified CM is thus prevented from shifting in a small amount.

The CM start position and the CM end position are described with respect to the image of one frame in the pattern file. Alternatively, the CM start position and a difference between the start position and the end position of the CM can be described.

For example, if information representing the number of frames or time between the start position and the end position is described, the information processing apparatus 1 can identify the end position from the identified CM start position. Conversely, the end position with respect to the image of one frame and the difference between the end position and the start position can be described.

In the above discussion, the positions of each image of an image sequence, such as the start position and the end position, are identified by the number of frames, or time. The positions of each image can be identified by the number of fields and a group of picture (GOP) number defined in moving picture experts group (MPEG) 2 and 4 standards. In moving images compressed in compliance with a variety of compression standards including enhanced versatile disk (EVD), the position of a CM is identified based on information representing the position of an image used in the compression standard.

In the above discussion, the pattern file is prepared on a per CM basis. If a logo of a manufacturer is displayed at the same timing in a plurality of CMs of a product sold by the manufacturer, the use of a single pattern file can be prepared for that manufacturer can serve the purpose of the CM extracting.

CMs of a commercial product A and a commercial product B are supplied from a manufacturer, for example. As long as the position (display timing) of a logo image of all CMs of the commercial product A and the position of a logo image of all CMs of the commercial product B are identical to each other, these CMs can be recognized using a single pattern file. The single pattern file is thus shared to recognize the plurality of CMs of the same manufacturer.

The pattern file is used not only to skip a CM and to cause the removable medium 20 to store a television program without the CM but also to collect CMs.

In the above discussion, the pattern file is prepared to extract the CM. The pattern file can be prepared to extract the television program itself. For example, the image of a title of a television program displayed at the head of a television program is specified by a pattern file. The start position and the end position is described in the pattern file with respect to the position of the title.

The above-references series of steps can be performed by not only software, but also hardware.

If the series of steps is performed by software, a program forming the software is installed from a recording medium or via a network onto a computer incorporated into a hardware structure or to a general-purpose computer, for example.

The recording media include the removable medium 20 of FIG. 1 storing the program and supplied separate from the apparatus to supply the user with the program. The recording media include a magnetic disk (including a flexible disk), an optical disk (such as a compact disk read-only memory (CD-ROM) and a digital versatile disk (DVD)), a magneto-optic disk such as MD® (Mini Disk), and a semiconductor memory. The recording media also include the ROM 12 and a hard disk included in the storage 17, each storing the program and supplied in the apparatus to the user.

The process steps discussed in this specification are sequentially performed in the time sequence order as stated. Alternatively, the steps may be performed in parallel or separately.

In this specification, the word system refers to one or a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    selecting means for selecting a predetermined extraction information from a plurality of predetermined extraction information identifying content to be extracted from among a plurality of contents organized in time sequence, each predetermined extraction information corresponding to a different content to be extracted, each predetermined extraction information including a feature contained in the content to be extracted and an extraction range in number of frames or amount of time relative to a position of the feature;
    first extraction means for extracting a predetermined image portion of each frame of the plurality of contents in accordance with the selected predetermined extraction information, the predetermined image portion being smaller than a frame;
    means for masking the predetermined image portion of each frame of the plurality of contents with a predetermined mask identified in the predetermined extraction information to isolate at least one feature corresponding to the feature contained in the selected predetermined extraction information from a background of the predetermined image portion of each frame;
    first detecting means for detecting, in the predetermined image portion of at least one frame of the plurality of contents, the at least one feature by comparing the at least one feature to the feature contained in the selected predetermined extraction information; and
    second extracting means for extracting, from the plurality of contents, a content in accordance with the extraction range contained in the selected predetermined extraction information once the at least one feature is detected in the at least one frame.

2. The information processing apparatus according to claim 1, further comprising:
    generating means for generating metadata representing a position of the content extracted from the plurality of contents.

3. The information processing apparatus according to claim 1, wherein the content to be extracted includes a commercial contained in a television broadcast content.

4. The information processing apparatus according to claim 1, wherein the feature contained in the content to be extracted comprises a predetermined image displayed by the content to be extracted.

5. The information processing apparatus according to claim 1, wherein the feature contained in the content to be extracted comprises a predetermined sound provided by the content to be extracted.

6. The information processing apparatus according to claim 1, further comprising:
    second detecting means for detecting one of a scene change and a mute period,
    wherein the predetermined extraction information further includes position information specifying a position of the feature contained in the content to be extracted, the content to be extracted is represented with respect to a position of one of the scene change and the mute period, and the first detecting means detects the at least one feature at the position specified by the position information, when one of the scene change and the mute period is detected.

7. The information processing apparatus according to claim 1, further comprising:
    storage means for storing the predetermined extraction information.

8. The information processing apparatus according to claim 7, further comprising:
    update means for updating the predetermined extraction information by downloading extraction information from a server connected via a network.

9. The information processing apparatus according to claim 1, wherein the extraction information includes a start position of the content to be extracted and an end position of the content to be extracted, the start and end positions being relative to the position of the feature.

10. The information processing apparatus according to claim 1, wherein the extraction information is written in XML.

11. An information processing method for causing an information processing apparatus to perform the steps comprising:

selecting, in a data processor, a predetermined extraction information from a plurality of predetermined extraction information stored in an electronic storage medium, the predetermined extraction information identifying content to be extracted from among a plurality of contents organized in time sequence, each predetermined extraction information being prepared for a different content to be extracted, each predetermined extraction information including a feature contained in the content to be extracted and an extraction range in number of frames or amount of time relative to a position of the feature;

extracting, in the data processor, a predetermined image portion of each frame of the plurality of contents in accordance with the selected predetermined extraction information, the predetermined image portion being smaller than a frame;

masking, in the data processor, the predetermined image portion of each frame of the plurality of contents with a predetermined mask identified in the predetermined extraction information to isolate at least one feature corresponding to the feature contained in the selected predetermined extraction information from a background of the predetermined image portion of each frame;

detecting, in the data processor, at least one feature in the predetermined image portion of at least one frame of the plurality of contents, the at least one feature corresponding to the feature contained in the selected predetermined extraction information; and extracting, in the data processor, a content in accordance with the extraction range contained in the selected predetermined extraction information once the at least one feature is detected in the at least one frame.

12. A non-transitory computer-readable medium storing computer readable instructions thereon, the computer-readable instructions when executed by a computer cause the computer to perform the method comprising:

selecting, a predetermined extraction information from a plurality of predetermined extraction information identifying content to be extracted from among a plurality of contents organized in time sequence, each predetermined extraction information being prepared for a different content to be extracted, each predetermined extraction information including a feature contained in the content to be extracted and an extraction range in number of frames or amount of time relative to a position of the feature;

extracting a predetermined image portion of each frame of the plurality of contents in accordance with the selected predetermined extraction information, the predetermined image portion being smaller than a frame;

masking the predetermined image portion of each frame of the plurality of contents with a predetermined mask identified in the predetermined extraction information to isolate at least one feature corresponding to the feature contained in the selected predetermined extraction information from a background of the predetermined image portion of each frame;

detecting, in the predetermined image portion of at least one frame of the plurality of contents, at least one feature corresponding to the feature contained in the selected predetermined extraction information; and extracting a content in accordance with the extraction range contained in the selected predetermined extraction information once the at least one feature is detected in the at least one frame.

13. An information processing apparatus, comprising:

a selector configured to select a predetermined extraction information from a plurality of predetermined extraction information identifying content to be extracted from among a plurality of contents organized in time sequence, each predetermined extraction information corresponding to a different content to be extracted, each predetermined extraction information including a feature contained in the content to be extracted and an extraction range in number of frames or amount of time relative to a position of the feature;

a detector configured to
extract a image predetermined portion of each frame of the plurality of contents in accordance with the selected predetermined extraction information, the predetermined image portion being smaller than a frame, mask the predetermined image portion of each frame of the plurality of contents with a predetermined mask identified in the predetermined extraction information to isolate at least one feature corresponding to the feature contained in the selected predetermined extraction information from a background of the predetermined image portion of each frame, and detect, in the predetermined image portion of at least one frame of the plurality of contents, at least one feature corresponding to the feature contained in the selected predetermined extraction information; and an extractor configured to extract, from the plurality of contents, a content in accordance with the extraction range contained in the selected predetermined extraction information once the at least one feature is detected in the at least one frame.

* * * * *